United States Patent [19]
Yuasa et al.

[11] Patent Number: 4,679,077
[45] Date of Patent: Jul. 7, 1987

[54] VISUAL IMAGE SENSOR SYSTEM

[75] Inventors: Hiroyoshi Yuasa, Hirakata; Akira Yasuda, Neyagawa; Koichi Omura, Osaka, all of Japan

[73] Assignee: Matsushita Electric Works, Ltd., Osaka, Japan

[21] Appl. No.: 794,228

[22] Filed: Nov. 1, 1985

[30] Foreign Application Priority Data

| Nov. 10, 1984 | [JP] | Japan | 59-237211 |
| Nov. 10, 1984 | [JP] | Japan | 59-237212 |
| Nov. 10, 1984 | [JP] | Japan | 59-237213 |
| Dec. 19, 1984 | [JP] | Japan | 59-269298 |
| Jan. 25, 1985 | [JP] | Japan | 60-12768 |
| Mar. 25, 1985 | [JP] | Japan | 60-60012 |
| May 29, 1985 | [JP] | Japan | 60-116229 |
| May 29, 1985 | [JP] | Japan | 60-116230 |
| May 29, 1985 | [JP] | Japan | 60-116231 |
| Jun. 25, 1985 | [JP] | Japan | 60-138508 |
| Jun. 25, 1985 | [JP] | Japan | 60-138510 |
| Jun. 25, 1985 | [JP] | Japan | 60-138519 |

[51] Int. Cl.$^4$ ............................................. H04N 7/18
[52] U.S. Cl. .................................... 358/108; 358/105; 240/518
[58] Field of Search .................. 358/108, 105, 109; 340/518, 555, 565, 521, 541, 937

[56] References Cited

U.S. PATENT DOCUMENTS

| 3,947,833 | 3/1976 | Eckstein, Jr. | 358/108 X |
| 4,081,830 | 3/1978 | Mick et al. | 358/210 X |
| 4,198,653 | 4/1980 | Kamin | 358/108 X |
| 4,317,130 | 8/1982 | Brown | 358/108 |
| 4,337,481 | 6/1982 | Mick et al. | 358/105 |
| 4,408,224 | 10/1983 | Yoshida | 358/108 |
| 4,543,567 | 9/1985 | Shirata | 340/518 X |

FOREIGN PATENT DOCUMENTS 159684 11/1980 Japan .

Primary Examiner—James J. Groody
Assistant Examiner—Victor R. Kostak
Attorney, Agent, or Firm—Burns, Doane, Swecker & Mathis

[57] ABSTRACT

A visual image sensor system for detecting an abnormal change in a monitored scene is disclosed, wherein normal changes which may occur in the monitored scene are previously memorized to be selectively compared with changes in the monitored scene, whereby the normal changes are discriminated from the actual abnormal change to be detected. An alarm is issued when the monitored scene includes a change different from any of the memorized normal changes selected according to one or more rational selection standards, whereby false or redundant alarms due to the normal changes are prevented. For further precise detection, abnormal changes which may occur in the monitored scene are also previously memorized to be compared with the changes in the monitored scene.

45 Claims, 58 Drawing Figures

Fig. 6

| A | B | C |
|---|---|---|
| D | E | F |
| G | H | I |

Fig. 7

| (i-1,j-1) | (i,j-1) | (i+1,j-1) |
|---|---|---|
| (i-1,j) | (i,j) | (i+1,j) |
| (i-1,j+1) | (i,j+1) | (i+1,j+1) |

Fig. 8A

| 0 | -1 | 0 |
|---|---|---|
| -1 | -4 | -1 |
| 0 | -1 | 0 |

Fig. 8B

| -1 | -1 | -1 |
|---|---|---|
| -1 | 8 | -1 |
| -1 | -1 | -1 |

Fig. 9

| 1 | 2 | 1 |
|---|---|---|
| 0 | 0 | 0 |
| -1 | -2 | -1 |

TM0

| 2 | 1 | 0 |
|---|---|---|
| 1 | 0 | -1 |
| 0 | -1 | -2 |

TM1

| 1 | 0 | -1 |
|---|---|---|
| 2 | 0 | -2 |
| 1 | 0 | -1 |

TM2

| 0 | -1 | -2 |
|---|---|---|
| 1 | 0 | -1 |
| 2 | 1 | 0 |

TM3

| -1 | -2 | -1 |
|---|---|---|
| 0 | 0 | 0 |
| 1 | 2 | 1 |

TM4

| -2 | -1 | 0 |
|---|---|---|
| -1 | 0 | -1 |
| 0 | 1 | 2 |

TM5

| -1 | 0 | 1 |
|---|---|---|
| -2 | 0 | 2 |
| -1 | 0 | 1 |

TM6

| 0 | 1 | 2 |
|---|---|---|
| -1 | 0 | 1 |
| -2 | -1 | 0 |

TM7

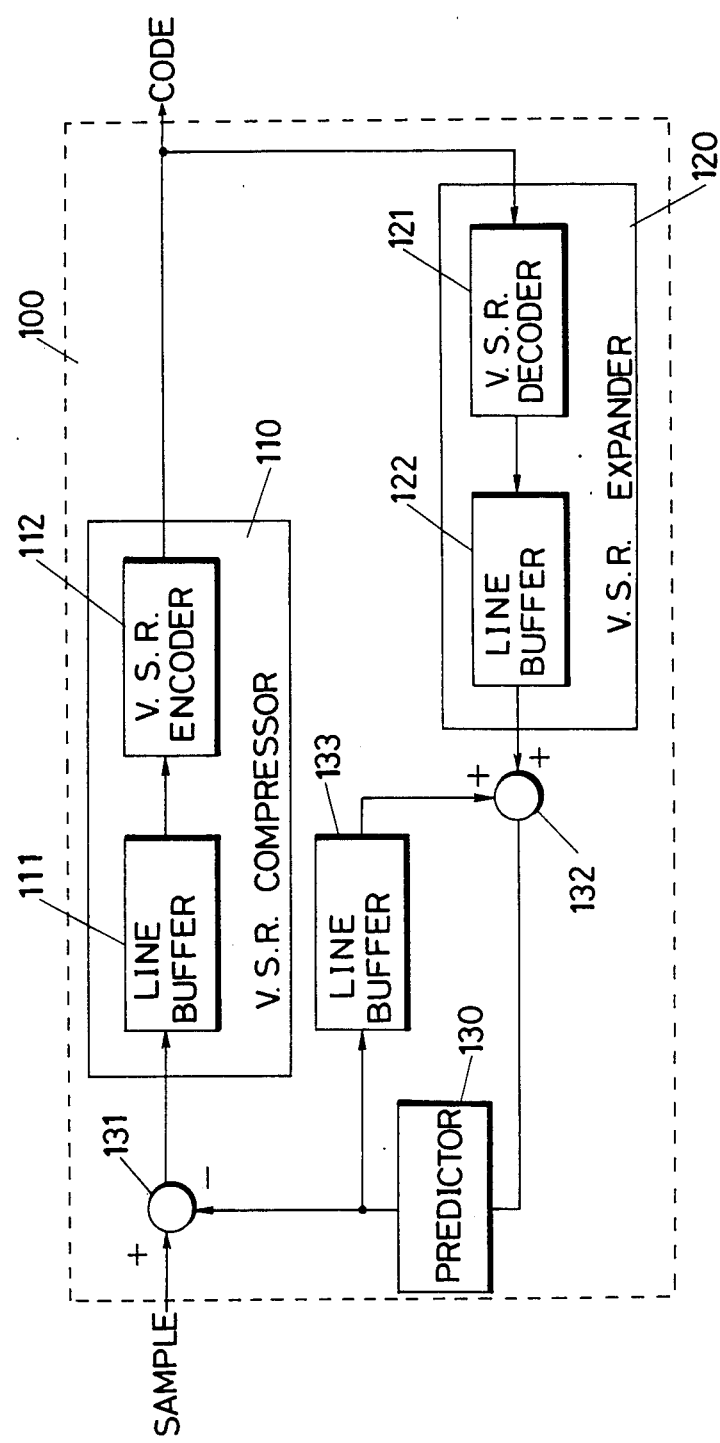

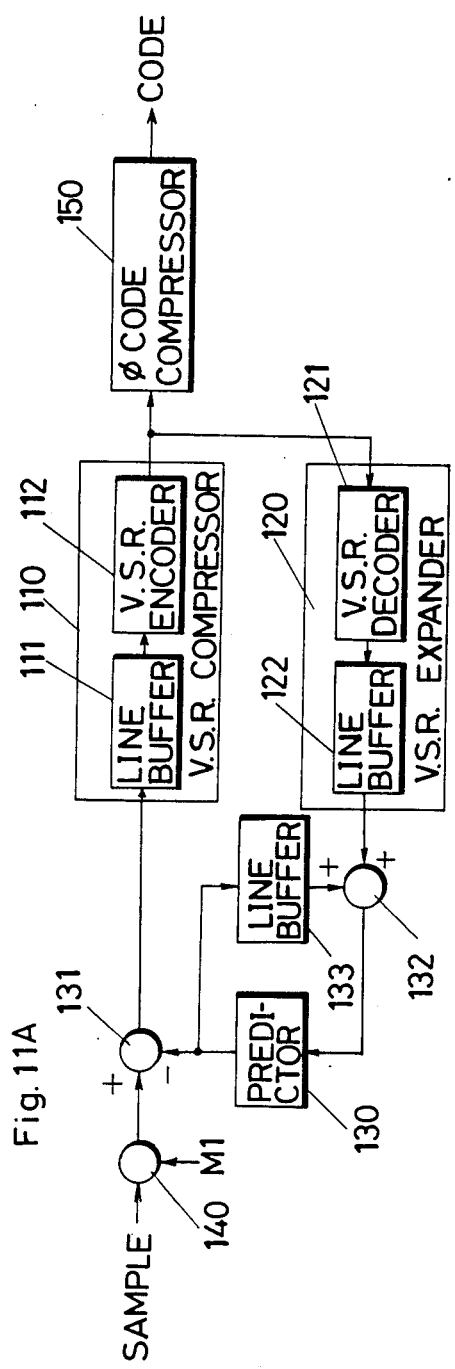
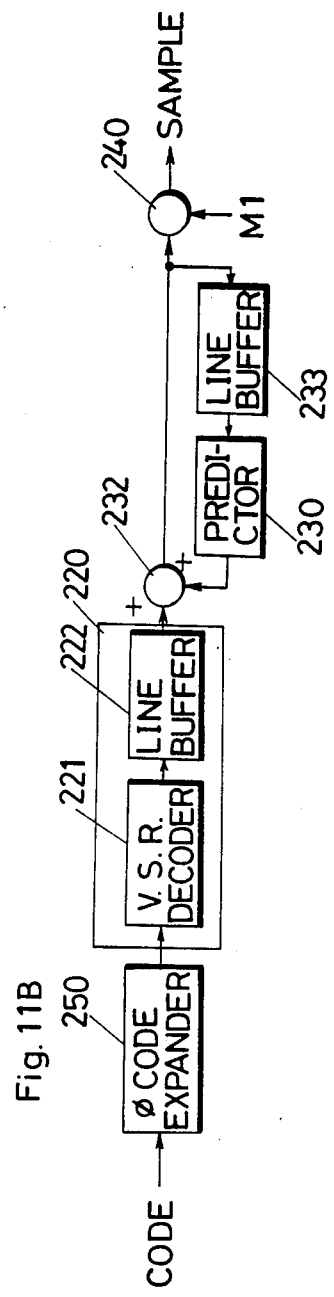
Fig. 11A
Fig. 11B

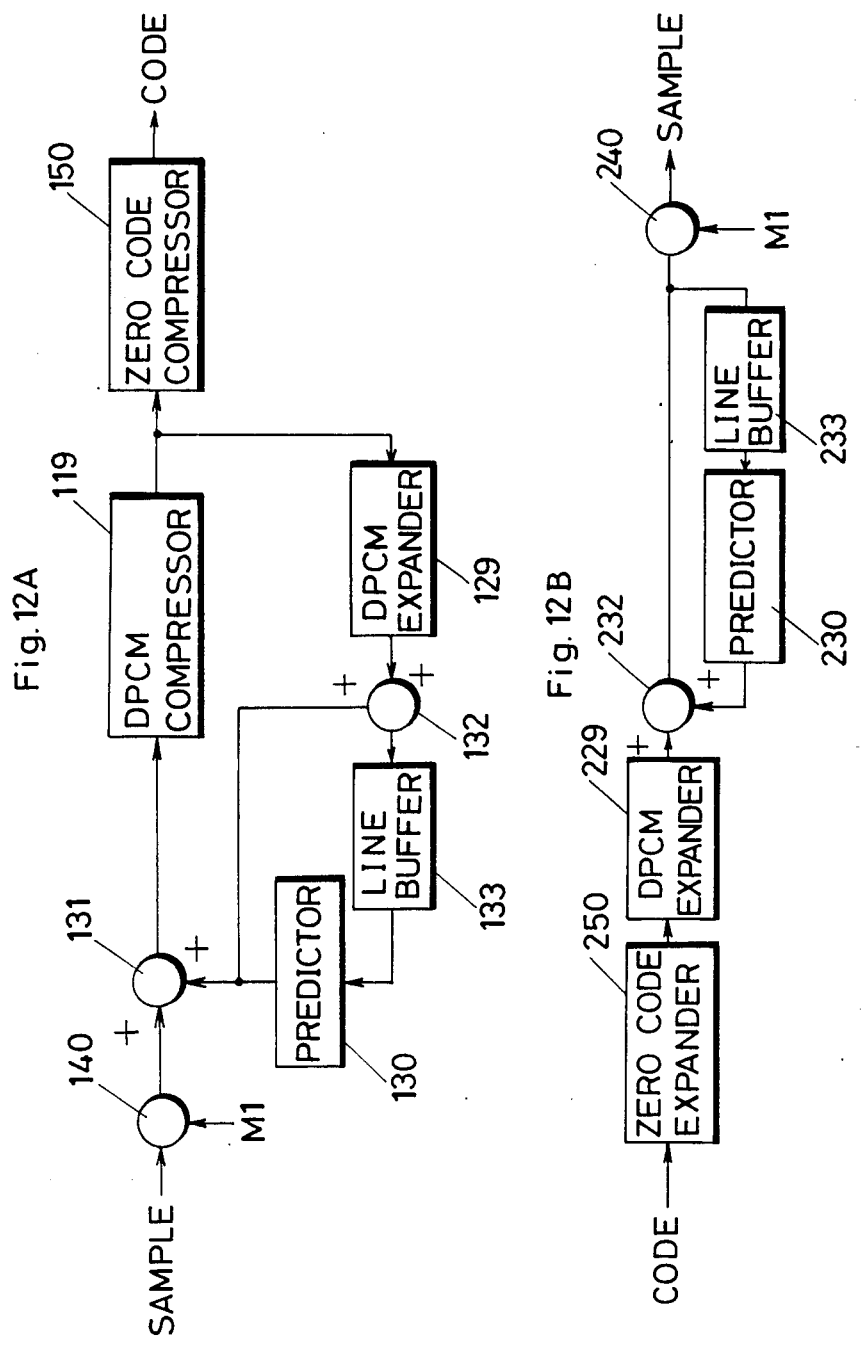

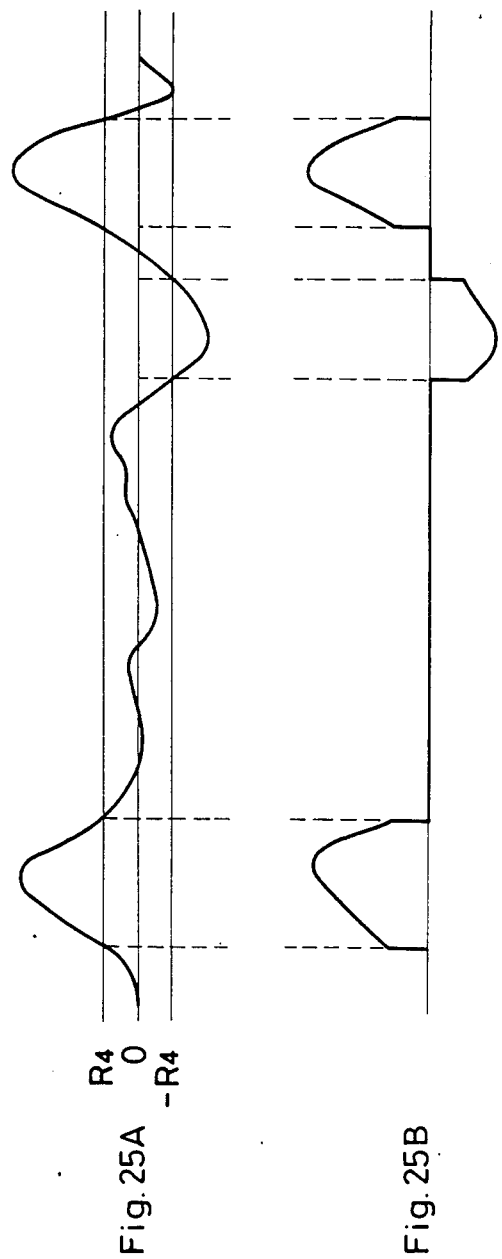

CHANGED PORTION a　　b　　c　　d b　　c

VISUAL IMAGE SENSOR SYSTEM

BACKGROUND OF THE INVENTION

1. Fields of the Invention

The present invention relates to a visual image sensor system which, in detecting an abnormal change in a picture monitored by a video camera, issues an alarm and transmits, if necessary, picture information via a telephone line after information compression. More particularly, the invention relates to a visual image sensor system in which the employment of artificial intelligence technique realizes proper judgment and minimizes the number of false alarms.

2. Description of the Prior Art

A conventional picture change detector system for detecting an intruder or another abnormal condition, such as disclosed in Japanese patent application No. 46791 of 1980 opened on Dec. 11, 1980 under Provisional Publication No. 159684/80, compares an input picture with a pre-set picture to issue an alarm when a difference between the two pictures is greater than a predetermined level. Said difference is evaluated by an averaged value and a maximum value of absolute differential values between picture signals of said two pictures in order to eliminate false detection caused by a noise. In this prior art, however, there is a drawback that normal changes which may occur in the input picture are not discriminated from actual abnormal changes to be detected. For instance, when a monitored region is set outdoors, the input picture monitored by a video camera must include changes in shaded portions, as the sun changes its position. Even if the monitored region is set indoors, the input picture must include changes in shaded portions when illumination is turned on or turned off. These changes, though they are not abnormal conditions, are detected as picture changes to issue false or redundant alarms in the conventional picture change detector.

Another type of picture change detector system, such as disclosed in U.S. Pat. No. 4,337,481, carries out scanning at two different rates in order to more reliably detect fast and slow motion in a scene being viewed. In this prior art, although the rate of the change is detected, directions or tracks of the change are not taken into consideration. Therefore, this prior art system cannot discriminate, for instance, a guest at an entrance from an illegal intruder through a window or over a fence, which also increases false or redundant alarms.

SUMMARY OF THE INVENTION

The above disadvantages or drawbacks have been eliminated by the present invention which includes means for memorizing a plurality of standard picture data including normal changes which may occur in the monitored scene, and means for memorizing one or more selection standards for selecting standard picture data to be compared with said monitored picture data. In general, a picture change detector system of the type having a video camera for monitoring a given region to generate monitored picture data normally includes a picture memory for memorizing a standard picture data to be compared with the monitored picture data and a comparator means for detecting a difference between the monitored picture data and the standard picture data. False alarms or redundant alarms have been caused when the monitored picture data include a picture change which is large enough to be detected by the comparator means and is nevertheless a normal picture change. The present invention is devised in view of this cause of false or redundant alarms, wherein a plurality of monitored picture data including normal picture changes large enough to be detected by the comparator means are previously memorized and selectively compared with the monitored picture, said selection being carried out rationally in accordance with one or more selection standards memorized previously, whereby the sensor system acquires discriminating ability to know the normal changes which may occur in the monitored scene from the actual abnormal changes to be detected, resulting in elimination of false or redundant alarms.

It is therefore a primary object of the present invention to provide a visual image sensor system capable of discriminating a normal change which may occur in a monitored scene from an actual abnormal change to be detected and issues an alarm only in detecting the latter.

In accordance with another aspect of the present invention, the visual image sensor system is provided with means for memorizing a plurality of standard picture data including abnormal situations which may occur in the monitored scene, and means for comparing the monitored picture data with said memorized picture data to identify a detected object, wherein abnormal objects are discriminated from normal ones on judgment standards previously memorized as to the respective objects.

It is therefore another object of the present invention to provide a visual image sensor system capable of identifing a detected object and judging the scene intelligently.

In accordance with preferred embodiments of the present invention, several picture compression transmission systems associated with the visual image sensor are employed for transmitting the monitored picture in detecting the picture change, so that the user can be immediately informed of critical situations in the monitored scene.

These and other objects and advantages of the present invention will become more apparent from the detailed description thereof taken with the accompanying drawings.

BRIEF DESCRIPTION OF THE DRAWINGS

In the drawings,

FIG. 6, FIG. 7, FIGS. 8A and 8B, and FIG. 9 are schematic illustrations to help explain the operation of a spatial filter employed in the first embodiment;

FIGS. 10A and 10B are block diagrams showing respectively an encoding circuit and a decoding circuit employed in the first embodiment;

FIGS. 11A and 11B are block diagrams showing modified circuits of the encoding and the decoding circuits in FIGS. 10A and 10B;

FIGS. 12A and 12B are block diagrams showing a particular case of the encoding and the decoding circuits in FIGS. 11A and 11B;

FIGS. 25A and 25B are wave form charts to help explain the operation of a changed picture element judgment circuit employed in the third embodiment;

DETAILED DESCRIPTION OF THE PREFERRED EMBODIMENTS

Figure 1:
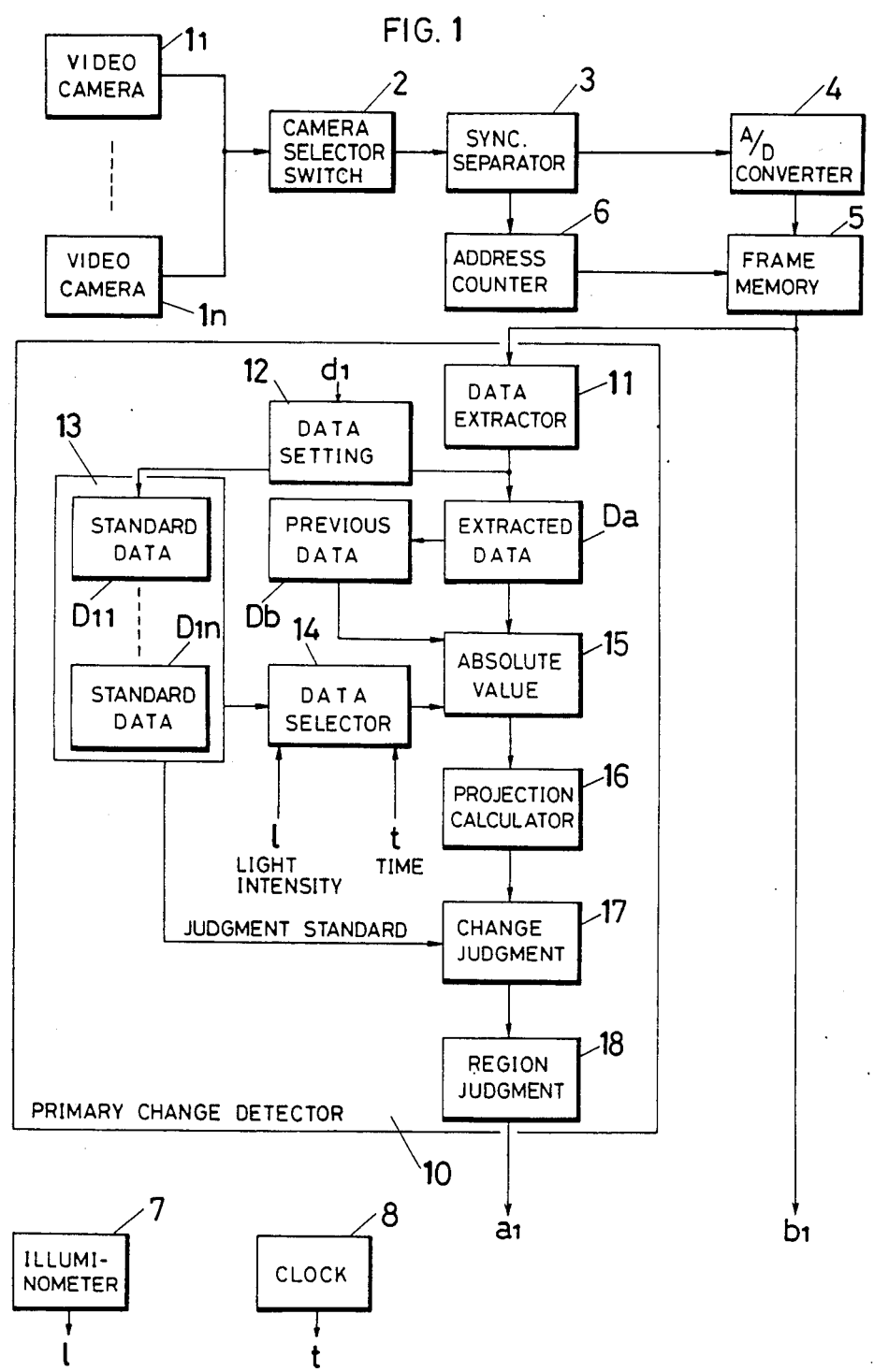
FIG. 1 is a block diagram including a primary change detector circuit employed in a first embodiment of the present invention.
Figure 2:
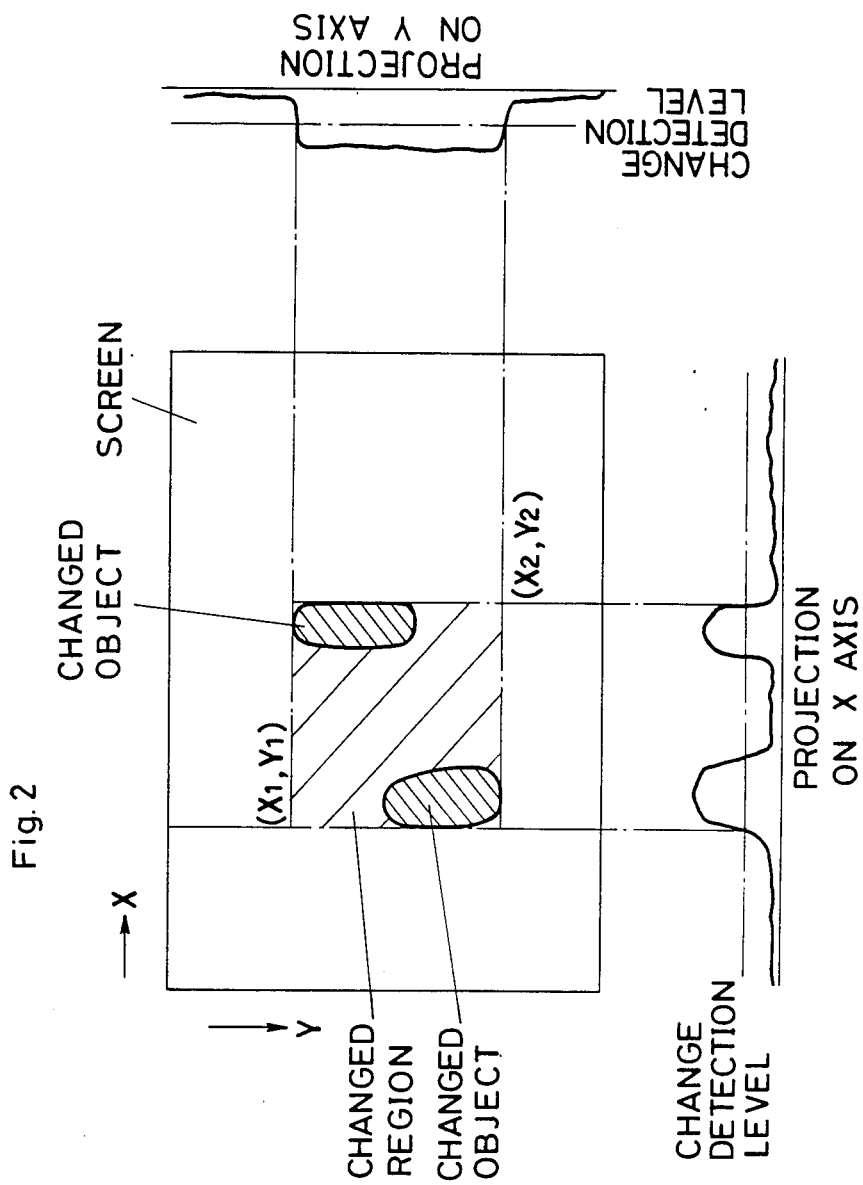
FIG. 2 is a schematic illustration to help explain projection calculation in the primary change detector circuit.
Figure 3:
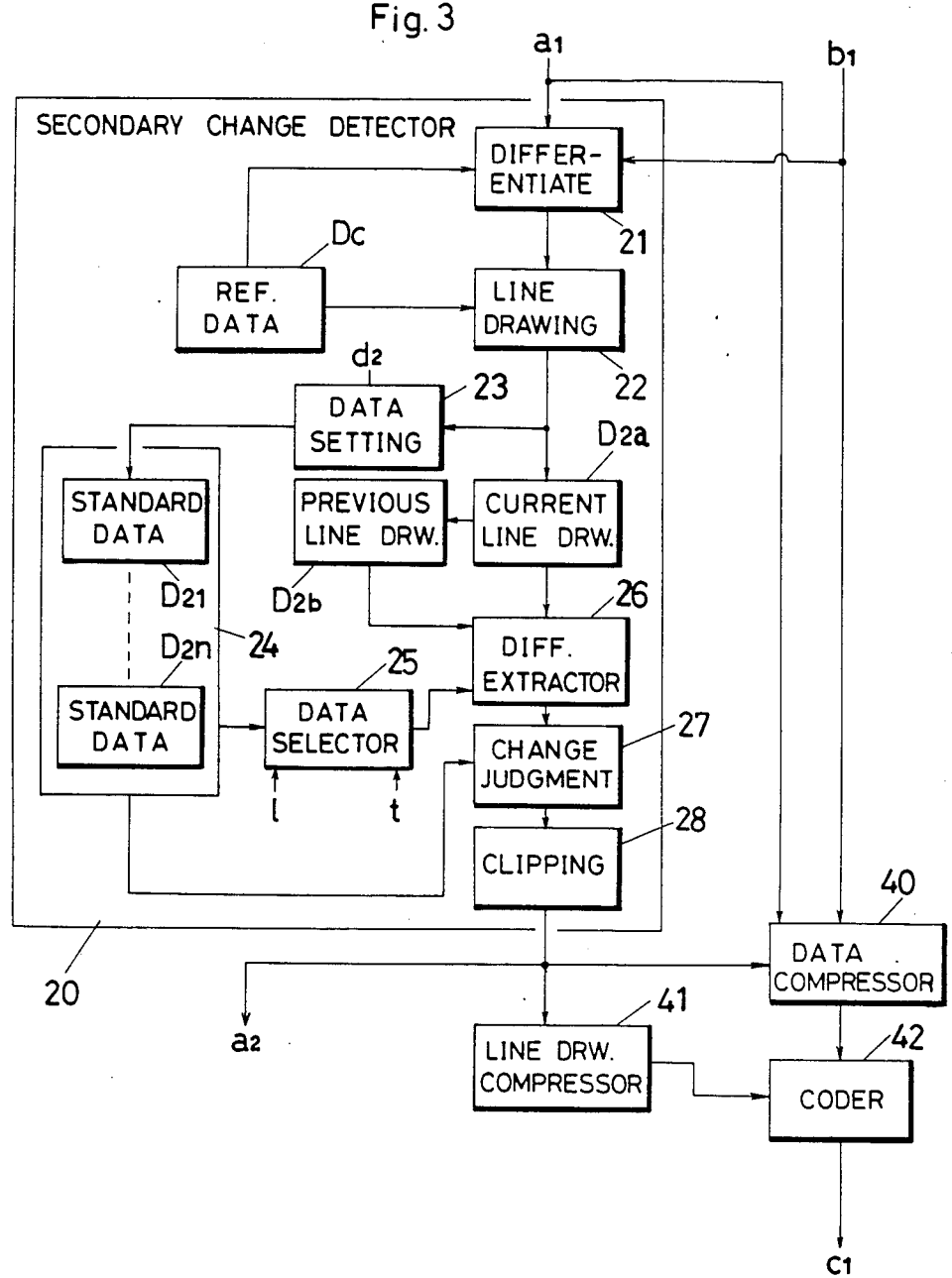
FIG. 3 is a block diagram including a secondary change detector circuit employed in the first embodiment.
Figure 4:
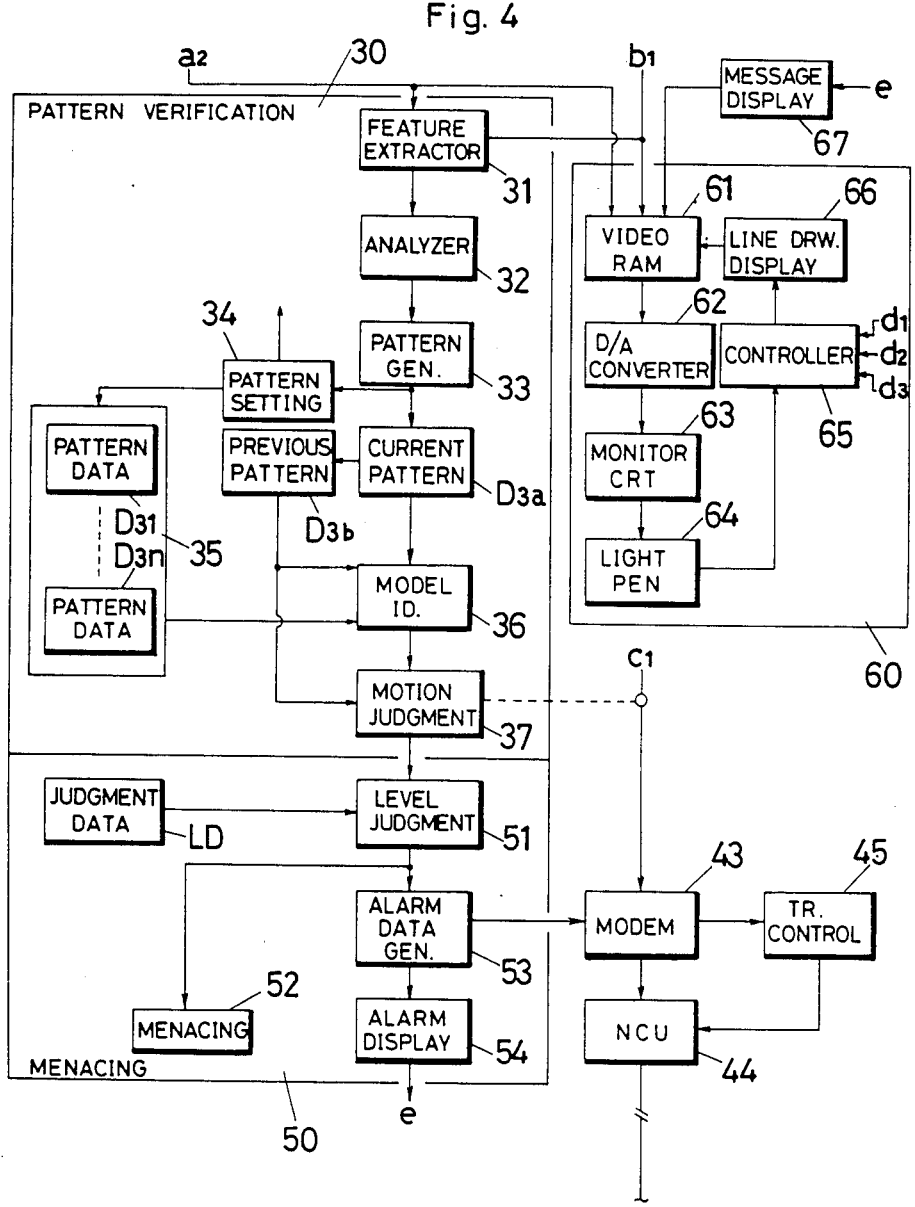
FIG. 4 is a block diagram including a pattern verification circuit employed in the first embodiment.

Referring now to the drawings and particularly to FIGS. 1 to 5, there is illustrated a first preferred embodiment of the present invention. FIG. 1, FIG. 3, and FIG. 4, when connected together as indicated, illustrate a block diagram of a visual image sensor system including picture transmission means. In FIG. 1, a plurality of monitoring video cameras $1_1$ to $1_n$ are switched by a camera selector switch 2, and respectively send video signals to a synchronous signal separator circuit 3. The synchronous signal separator circuit 3 separates a horizontal and a vertical synchronous signals from a picture signal in the video signal. When externally synchronized cameras are employed, the synchronous signal separator circuit 3 is used for a synchronous signal generator circuit which supplies a synchronous signal to the cameras. The picture signal is converted into digital values by an A/D converter (or Analog-to-Digital converter) 4, and stored in a frame memory 5. Each digital value may be represented by 6 to 8 bits binary code. In the present embodiment, one picture in the frame memory 5 consists of 256 multipied by 256 picture elements, each of which is represented by 8 bits binary code. The picture, therefore, has 256 grey levels and is monochrome. The address counter 6 receives the synchronous signal from the synchronous signal separator circuit 3 and generates writing addresses for the frame memory 5 as its ouput.

A primary change detector circuit 10 computes absolute values of frame-to-frame differential signals, and sums up said absolute values in X and Y directions in order to obtain projection of said differential signals on X and Y axes as shown in FIG. 2. The projection thus obtained is utilized for evaluating picture change magnitude and determining coordinates of a changed region. A primary data extractor circuit 11 extracts rough picture data from fine picture data consisting of 256 multiplied by 256 picture elements in the frame memory 5. The rough picture data or the extracted data Da consists of 64 multiplied by 64 picture elements, each of which is derived from 4 multiplied by 4 picture elements of said fine picture data. In order to be proof against spike noises, the extracted data Da may be an averaged data of a group of 4 multiplied by 4 picture elements surrounding each change detection lattice which corresponds to said 64 multiplied by 64 picture elements.

A primary standard data setting circuit 12 registers the extracted data Da corresponding to background pictures of a monitored region into a memory circuit 13 as primary extracted standard data D11 to D1$n$, and also determines a threshold level to detect a picture change. The monitored region is determined by a condition setting controller 65 in FIG. 4. The monitored region generally includes inside thereof a region for picture change detection in order to prevent a changed object such as an intruder from being caught by its edge part only.

The primary extracted standard data D11 to D1$n$ or the standard picture data comprise a plurality of data indicating normal changes caused by time lapse or a change of light intensity at the monitored region. The primary extracted standard data D11 to D1$n$ stored in the memory circuit 13 are selectively read out by instructions from a primary standard data selector circuit 14 in accordance with the present light intensity detected by an illuminometer 7 and the present time counted by a clock 8, and loaded into an absolute value circuit 15. That is to say, the primary extracted standard data corresponding to the present light intensity and corresponding to the present time are read out from the memory circuit 13.

The absolute value circuit 15 reads the primary extracted data Da extracted from the frame memory 5 by the primary data extractor circuit 11, the primary extracted standard data D1i selectively read out from the memory circuit 13 by the primary standard data selector circuit 14, and primary extracted previous data Db of the previous picture that is previous to the current picture. The latter two or the data D1i and Db define the standard pictures for reference. The absolute value circuit 15 calculates differential values between the primary extracted data Da and the primary extracted standard data D1i or the primary extracted previous data Db, and calculates absolute values by eliminating negative signs from or squaring the respective differential values in order to evaluate change magnitude in respecive picture elements. The primary extracted previous data Db of the previous picture may be averaged picture data of a plurality of further previous picture data, which allows the standard picture to be renewed in accordance with a very slow picture change such as a picture change caused by a change of sunshine.

The absolute value circuit 15 comprises a process for examining change magnitude in each picture element. Namely, in this process, the absolute value circuit 15 examines whether or not the change magnitude in each picture element is greater than a standard value R1 for change detection of a picture element. The standard value R1 is determined such that the change magnitude is valid when it is greater than the standard value R1. When the change magnitude of a certain picture element is not greater than the standard value R1, the absolute value circuit 15 makes the change magnitude of that picture element zero.

The detected data concerning the change magnitude in picture elements, which are obtained by examining the same in the absolute value circuit 15, are utilized for the calculation of projection in a projection calculator circuit 16. The projection means the respectively summed up values of the change magnitude in X and Y directions. As illustrated in FIG. 2, the sum of said detected data concerning change magnitude of the picture elements included in respective lines parallel to the Y axis are projected on the X axis as projected data on the X axis, and the sum of said detected data concerning change magnitude of the picture elements included in respective lines parallel to the X axis are projected on the Y axis as projected data on the Y axis. Owing to said change detection of picture elements in the absolute value circuit 15, the change magnitude of the respective picture elements below said standard value R1 inflicts no influence on the projection or the summed up values, so, A/D conversion errors or noises are eliminated from the projection, which allows a further precise change detection.

A primary change judgment circuit 17 calculates minimum values X1, Y1, and maximum values X2, Y2 of the X, Y coordinate in which said projected data on the X axis and projected data on the Y axis respectively surpass a standard value R2 of projection intensity, whereby change detection coordinate (X1,Y1), (X2,Y2) of a rectangular region are determined. Within said rectangular region, X coordinate is greater than X1 and smaller than X2, and Y coordinate is greater than Y1 and smaller than Y2. When the size of this rectangular region surpasses a region size standard value R3 or (XR3,YR3) of projected region, i.e., when (X2−X1) is greater than XR3 and (Y2−Y1) is greater than YR3, the circuit 17 judges a picture change to be existent.

Sequence control of change detection, or the change detection process from the absolute value circuit 15 to the primary change judgment circuit 17 is repeatedly carried out for comparing the current picture with a plurality of standard pictures such as the primary extracted standard data D1i corresponding to the background pictures or the primary extracted previous data Db corresponding to the previous picture. When the current picture is different from any of the primary extracted standard data D1i corresponding to the background pictures comprising normal picture changes, and also different from the primary extracted previous data Db corresponding to the previous picture, a final decision is made that a picture change is existent.

As the case may be, the current picture is, for instance, compared with the primary extracted previous data Db of the previous picture firstly and thereafter compared with the primary extracted standard data D1i of the background pictures secondly. In another case, the current picture is compared with the former only or with the primary extracted previous data Db of the previous picture only. The above two cases are selected in accordance with a selected manner of picture transmission, etc. The change detection coordinate (X1,Y1), (X2,Y2) of the rectangular region finally obtained correspond to the standard picture finally compared.

Before transmitting picture information at the time of said change detection, a primary changed region judgment circuit 18 again calculates the minimum values X1, Y1, and the maximum values X2, Y2 of X, Y coordinate in which said projected data on the X axis and projected data on the Y axis respectively surpass a standard value R5 of a projection change, whereby changed region coordinate (X1,Y1), (X2,Y2) of a rectangular region are obtained again. The circuit 18 produces, as its output, said coordinate and a judgment result of a primary change detection. Said value R5 is smaller than said value R2 in general. Picture information of the rectangular region determined by said changed region coordinate (X1,Y1), (X2,Y2) or a rectangular region comprising a constant width region surrounding said rectangular region may be quickly transmitted by a block transmission mode.

Namely, the picture information of said rectangular regions is compressed in a data compressor circuit 40 illustrated in FIG. 3 by using a DPCM system of line-to-line prediction residuals or a variable sampling rate coding system of line-to-line prediction residuals. After said information compression, zero code / zero line compression coding is carried out in a coder circuit 42. After these two stages of information compression, picture information is narrow-band transmitted under the control of a transmission controller 45 illustrated in FIG. 4 through a MODEM (MOdulating and DEModulating device) 43, a NCU (Network Controlling Unit) 44, and a telephone line L. When a picture change is detected, the NCU 24 automatically dials telephone communication means, and transmits picture information of the whole of or a changed part of the monitored picture or the current picture.

Said picture information transmission makes it possible to ascertain by a transmitted picture whether an abnormal condition has actually occurred or a false alarm has been issued, and to take rapid countermeasures by reporting to a police station or a fire brigade station or by dispatching the personnel, etc. In the present embodiment, as picture information is transmitted through a telephone line L, it is economical as compared with a device using a personal picture transmission circuit. A simple and cheap picture monitoring device can be fabricated which comprises said means for primary picture change detection and means for transmitting the changed part of the picture, whereof an explanation will be given hereinafter together with the explanation of a picture compression transmisson system.

When no change is detected as a result of the comparison between the primary extracted standard data D1$i$ corresponding to the background picture and the primary extracted data Da corresponding to the current picture, it is preferable to replace the data D1$i$ by the primary extracted data Da, whereby false alarms caused by normal and natural changes such as those of sunshine etc. are eliminated. As is suggested before, the change detection operation becomes especially stabilized against small changes of a picture by employing averaged data of previous pictures as the primary extracted standard data D1$i$ corresponding to the background picture.

After the primary change detection, a secondary change detector circuit 20, which is illustrated in FIG. 3, reads in the picture data from the frame memory 5 and differentiates said picture data in a differentiation circuit 29, and converts the differentiated picture data into a line drawing data on the basis of edges and contours in a line drawing generator circuit 30. Reference data Dc for generating the line drawing data are given by operators of a spatial filter, which has windows whose lattice size is 3 multiplied by 3 or 5 multiplied by 5, etc. For instance, as illustrated in FIG. 6, operators of a 3 multipled by 3 spatial filter are expressed by windows A to I. Said operators change the value of a coordinate (i,j) into a sum of picture element values including surrounding picture elements as illustrated in FIG. 7 multiplied by respectively weighted windows in FIG. 6. Namely, when a value V(i,j) is a brightness value of a picture element at coordinate (i,j), the value V(i,j) after operation of the spatial filter becomes the summed up value of multiples of the respective values of the original picture elements by the respective weights of corresponding windows, which can be expressed by the following mathematical expression:

$$A \times V(-1, j-1) + B \times V(i, j-1) + \ldots + E \times V(i,j) + \ldots + I \times V(i+1, j+1).$$

The spatial filter operation as mentioned above has been utilized in pipe line processors for digital signal processing, micro-programming system of bit slice processors, or parallel processing by data flow processors, and can be utilized for real-time processing of an ITV signal at the rate of 30 pictures per second.

Various values are assigned to said windows A to I for generating the line drawing, and these values are included in the reference data Dc for generatig the line drawing data. FIGS. 8A and 8B illustrate examples of known operators for differentiation. FIG. 8A shows tetradirectional Laplacian and FIG. 8B shows octadirectional Laplacian. FIG. 9 shows Robinson operators, which allow calculation of edge intensity or edge direction by a maximum output value among 8 values that are obtained by operation of 8 templet operators TM0 to TM7.

In the process of generating the line drawing data, a binary picture comprising brightness and darkness only is made out of an emphasized picture that is emphasized in its edges and contours by differentiation for ensuring line detection. Said binary picture includes broken lines, which are shaped into connected lines in said line drawing generator circuit 22. In the line drawing generator circuit 22, too, operators of the spatial filter having 3 multiplied by 3 or 5 multiplied by 5 lattice size as illustrated in FIG. 6 are utilized for shaping process by propagation degeneration of the binary picture or extending process by detecting line connection.

Edges and contours are important sources of information in order to identify the shape of an object, and they are advantageously less affected by changes of external light intensity caused by the weather, headlights of an automobile, a neon sign, etc. than a mere difference between light and shade is. In the present invention, the above mentioned characteristics of edges and contours are utilized for designating important lines among the line drawings by a condition setting controller 65 and a line drawing display circuit 66. Further precise monitoring can be realized by judging whether or not said important lines are concealed by something.

In the secondary change detector circuit 19, line drawing data of the background of the monitored region are registered by a secondary data setting circuit 23 into a memory circuit 24 as a plurality of secondary standard data D21 to D2$n$. A standard value for change judgment is also registered in the memory circuit 24. Similarly to the primary change detection, a difference extractor circuit 26 calculates a difference between line drawing data D2$a$ of the current picture and line drawing data D2$b$ of the previous picture. The difference extractor circuit 26 also calculates a difference between the secondary standard data D2$i$ and the line drawing data D2$a$ of the current picture. A secondary standard data selector circuit 25 selects secondary standard data D2$i$ among said secondary standard data D21 to D2$n$ in accordance with light intensity and/or time data obtained from the illuminometer 7 and/or a clock 8, just like the case of the primary change detection.

A secondary change judgment circuit 27 compares the difference between the secondary standard data D2$i$ and the line drawing data D2$a$ of the current picture with the standard value for change judgment of the line drawing. When a calculated value is greater than the judgment standard value, the secondary change judgment circuit 27 judges an abnormal change to be existent. At this occurrence, a line drawing clipping circuit 28 clips the changed portion of the line drawing data.

The above mentioned process simplifies and ensures verification of picture data of binary pictures in which important lines only are compared. Main lines of the scenes necessary to ascertain and verify the location of important lines of line drawing data of the pre-set monitored region background are designated by the condition setting controller 65 and the line drawing display circuit 66, and the scenes are expressed as a kind of graph or as relationship between lines (or branches) and their connections (or nodes), which are registered into the memory circuit 24 as a plurality of secodary standard data D21 to D2$n$ in accordance with time and light intensity.

The line drawing data are described in a classed list form. The important lines in line drawing data and main lines in the scenes in the list form are labelled with the aid of the line drawing display circuit 66. Coordinate, the kind of lines, and relationship of mutual connection of lines are expressed by classed or comprehensive list forms, wherein general composition is described by main lines in an upper class and detailed composition is described in a lower class.

The verification is carried out in the difference extractor circuit 26, concerning line drawing data of binary picture firstly, i.e., concerning the line drawing data D2a of the current picture and the line drawing data D2b of the previous picture or the secondary standard data D2i, and important lines are compared by list verification in accordance with the order from the upper class down to the lower class after ascertaining the corresponding relationship between line drawing data in the list form and the line drawing data of the binary picture.

In order that the verification might be carried out uniquely in the upper class, the corresponding relationships of nodes and branches of main lines of the scenes are determined such that the identification in the upper class can be carried out easily and distinctly. Basically speaking, the location of nodes and branches make no change in the same picture. Therefore, when important lines are found to be inconsistent, the secondary change judgment circuit 27 judges a change to be existent.

The line drawing clipping circuit 28 clips the changed portions of line drawing data in the list form or the line drawing data of the binary picture. As the surrounding portions of extinguished lines as compared with the secondary standard data D2i are surrounded by appearing lines, line drawings surrounded by the periphery of these appearing lines are clipped. When a change of the line drawing data is detected in the course of transmission of picture data, the clipped line drawing data are compressed by a line drawing data compressor circuit 41, and the direction of coordinate of end points and the direction of a series of points connected thereto are coded in 1 to 3 bits per one link in a coder circuit 42 by a known Freeman's chain code, and narrow-band transmitted through the MODEM 43, the NCU 44, and the telephone line L under the control of the transmission controller 45 illustrated in FIG. 4.

Said line drawing data transmission makes it possible, even if the picture data of changed region is under transmission, to report the phase of changes or the location change every moment by line drawing data when changes are existent. Therefore, the abnormal situations can be judged more precisely by observing the manner of motion. It is also possible to issue a further precise alarm free from the influence of external light by the use of an alarm processing.

Although said change judgment standard of line drawings corresponds to a change level, the judgment standard may be separately set for important line drawings, for not so important line drawings, and for neglectable line drawings. In this case, when the important line drawings change, an alarm level is set highly. When the important line drawings do not change and not so important line drawings change, the alarm level is set in the middle. When neglectable line drawings change only, the change is neglected and the line drawing clipping circuit 28 does not operate.

In the meanwhile, although occurrence of an abnormal situation can be judged by the primary change detection and the secondary change detection described in FIG. 1 and FIG. 3 respectively, a pattern verification circuit 30 as illustrated in FIG. 4 is employed in order to ensure further precise judgment, which can be regarded as a third change detection. Said process in the secondary change detector circuit 20 is similar to that of this pattern verification circuit 30 in that the verification of picture data for change detection is carried out by so-called symbolic processing.

In the pattern verification circuit 30, a variety of patterns of abnormal situations and changed objects are registered in advance into a memory circuit (or knowledge base) 35 as standard picture data by a pattern setting circuit 34 under the control of the condition setting controller 65, and a model identifier circuit 36 judges the abnormal situations and verifies the changed objects by comparing the current picture data with the registered patterns. A feature extractor circuit 31 reads the line drawing data of the binary picture, and extracts features that are essential and fundamental elements; feature points such as end points, bent points, and intersections of line drawings in accordance with physical rules; and closed regions surrounded by line drawings. The extracted features are labelled and made into list-formed line drawing data in the feature extractor circuit 31. A structure analyzer circuit 32 and a pattern generator circuit 33 generate said patterns to be registered as classed lists.

In monitoring condition, the structure analyzer circuit 32 analyzes the relationships between the features that are essential and fundamental elements and the features expressed by connection relationships based on physical rules such that the relationships are ordered according to comprehensive relationship.

In circumstances setting condition, the structure analyzer circuit 32 labels the list-formed line drawing data with the aid of the line drawing display circuit 66 in accordance with manual input by using a monitor CRT 63 and a light-pen 64, and expresses coordinate or the kind of lines and mutual connection relationship of lines in classed or comprehensive list-formed models, whereby the patterns to be registered are generated.

In said list-formed model, general structure is shown by main lines in the upper class such as contours and frame lines and minute structure is shown in the lower class. The list-formed model is equivalent to a tree-structure graph, which has a data name or the name of the changed object at its root, upper class data at its nodes, and lower class data at its leaves, and is accompanied by restriction conditions for recognition or rules for interpreting meanings of the scenes. In addition, location information is normalized as to the upper class in order to allow verification by numerical calculation. Thus generated patterns, restriction conditions, and rules for interpreting meanings of the scenes are registered into the memory circuit 35. The model indentifier circuit 36 compares with the registered patterns, interprets and identifies the current picture data on the basis of said restriction conditions and said rules for interpreting meanings of the scenes in the memory circuit 35.

According to respective picture monitoring devices, different contents are registered in the memory circuit 35. For instance, the pattern data D31 to D3n of changed objects such as humans, flames or smoke in a fire, and animals are generated in advance by the pattern generator circuit 33 and the line drawing display circuit 66, and registered into the memory circuit 35 by the pattern setting circuit 34. The pattern data D31 to D3n include respectively judgment standards such as shapes, sizes, locations, moving directions of the respective changed objects as rules or restriction conditions, and on these judgment standards, the model identifier circuit 36 and motion judgment circuit 37 judge whether the conditions are abnormal or normal.

The patterns are classed as to the elements such as shapes, sizes, locations, and moving directions such that the changed object in the monitored picture or changes thereof can be judged as to which category they belong to. For instance, in the case that a human intrudes into a monitored region, the patterns are classed into categories as to wherefrom the intruder comes and classed into other categories as to which kind of person comes in. The patterns are thus dividedly registered in accordance with transitions of abnormal conditions at the time of intrusion, which allows judgment based on intrusion tracks.

The pattern verification circuit 30 also reads the line drawing data clipped at the secondary change detection, generates the pattern data after structure analysis, compares the pattern data D3b of the previous picture with the pattern data D3a of the current picture, if necessary, in the model identifier circuit 36, verifies the changed object by comparing the registered pattern data D3i and the pattern data D3a of the current picture generally, and judges the shapes, the sizes, the locations, and the moving directions of the changed objects as to the respective registered pattern data D3i by the motion judgment circuit 37, whereby the motion of the changed objects can be detected and tracked.

A menacing processor circuit 50 judges an alarm level in accordance with regions where motion of objects or abnormal changes take place, and issues an alarm in accordance with the judged level. Vigilance level judgment data LD are memorized in advance as to respective vigilance regions. When motion of objects or abnormal changes take place in a certain vigilance region, a vigilance level judgment circuit 51 compares said changed region with the data LD. When said changed region corresponds to the vigilance region of a predetermined vigilance level, menacing means 52 operates. The menacing means 52 comprises a siren, a bell, or a speaker, etc. After the menacing, alarm levels are selected and alarm data corresponding thereto are generated. For instance, when changed object is extinguished by the menacing, a lowest alarm level is selected. When no change occurs as to the location of the changed region, an intermediate alarm level is selected. When the changed object moves into a region of a higher vigilance level, a highest alarm level is selected. Needless to say, there is some expected effect that a first menacing may repel an intruder.

An alarm data generator curcuit 53 generates alarm data in accordance with information from the vigilance level judjement circuit 51. The alarm data are transmitted through the MODEM 43, the NCU 44, and the telephone line L, together with the picture data and the line drawing data. An alarm display circuit 54 displays the present alarm level in accordance with said alarm data by light emitting display means, and controls a message display circuit 67 in accordance with said alarm level. The message display circuit 67 is provided for indicating the contents of the alarm data with characters on a screen of a monitor CRT 63 that is provided in a control board 60.

The control board 60 includes a video RAM 61 for display of the line drawing data, the poctµre data, and the character data for message display. These data on the video RAM 61 is displayed on the screen of the monitor CRT 63. Another purpose of the video RAM 51 is to set the monitored regions, to set the vigilance regions corresponding to the vigilance levels, to determine the weight or the importance of the line drawings, to set patterns of said abnormal conditions, to generate pattern data comprising models of changed objects and list-formed models of the scenes, and to determine restriction conditions and rules for interpreting meanings of the scenes, by means of the light-pen 64 or a so-called mouse or a keyboard with visual aid of the picture displayed on the screen of the monitor CRT 63. These data are sent to the primary data setting circuit 12, the secondary data setting circuit 23, and the pattern setting circuit 34, and registered in the memory circuits 13, 24, and 35 under the control of the condition setting controller 65. The line drawing display circuit 66 is, as suggested before, a circuit for displaying line drawings on the screen of the monitor CRT 56 at the time of setting said weight or importance of the line drawings or generating models of changed objects, etc.

Figure 5:
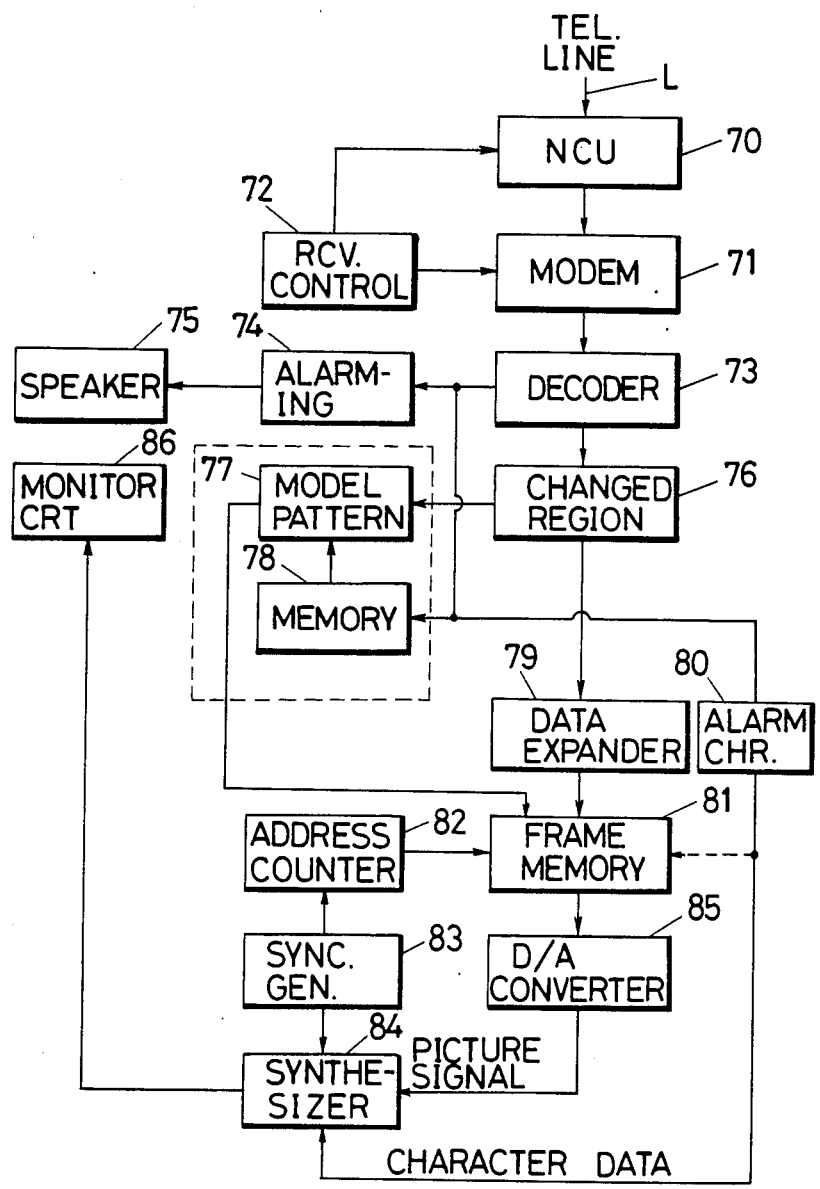
FIG. 5 is a block diagram of a receiver circuit employed in the first embodiment.

The picture data, the line drawing data, and the alarm data transmitted through the telephone line L are received by a NCU 70 and a MODEM 71 under the control of a receiver controller 72 of the receiver as illustrated in FIG. 5. In the receiver, these data are decoded by a decoder circuit 73. A monitor CRT 86 displays the picture or the line drawing, and a speaker 75 issues an alarm sound. An alarming circuit 74 is operated in accordance with decoded alarm data, and generates an alarm sound comprising a voice signal synthesized systematically, which is announced from the speaker 75. When the alarm data are described correspondently to the changed objects or the list-formed models of the scenes, it is possible to announce abnormal situations by vocally expressed sentences and to explain judgement process etc. on the basis of data or rules. An alarm character display circuit 80 is provided for making character data for alarm message display in accordance with alarm data, which are superimposed as messages on picture signals or line drawing signals and displayed on the screen of the monitor CRT 86.

A changed region setting circuit 76 is provided for detecting changed region given by the coordinate (X1, Y1), (X2, Y2) from picture data and line drawing data etc. extracted by the decoder circuit 73. A data expander circuit 79 decodes and expands picture data and line drawing data coded by the DPCM system of line-to-line prediction residuals or the variable sampling rate coding system of line-to-line prediction residuals. The decoded expanded data are written into a frame memory 81. The contents of the frame memory 81 are read out by an address counter 82, sent into a D/A converter 85, in which the data are converted into analog picture signals. Said picture signals are mixed with synchronous signals from a synchronous signal generator circuit 83 together with said character data in a signal synthesizer circuit 84, and synthesized data are displayed on the monitor CRT 86.

In the present embodiment, picture data of a changed region or clipped line drawing data are transmitted, but there is a certain limitation to transmission rate as even the line drawing data have some amount of information. To eliminate this drawback, it is preferable to register symbolic data corresponding to the registered pattern data D31 to D3n in the memory circuit 35 together with the registered pattern data D31 to D3n, and to transmit the symbolic data corresponding to the registered pattern data D3i through the telephone line L by way of the motion judgment circuit 37, the MODEM 43, and the NCU 44 before transmission of picture data and line drawing data of a changed region when the kind, the location, and the size etc. of a changed pattern are similar to one of the registered patterns and both belong to the same category. In the receiver, a memory circuit 78 is provided as shown in a broken line frame in FIG. 5.

In this memory circuit 78, model pattern data are registered in advance which are the same as the registered pattern data D31 to D3n. When said symbolic data are received, corresponding model pattern data are read out and written into the frame memory 81 by way of a model pattern data display circuit 77, and the contents of the frame memory 81 are displayed on the screen of the monitor CRT 86, whereby the receiver can be rapidly informed of a general report by transmission of symbolic data having small amount of information.

When a packet multiplex system of high rate transmission by way of digital data exchange networks (DDX) is employed for transmission of picture data or voice data, the receiver can monitor a plurality of transmitters at a time through one circuit. However, the MODEM 43 and the NCU 44 in the transmitter or the NCU 70 and the MODEM 71 in the receiver only have transmission rate of 1200 bits per second at maximum, which is by far lower than high rate transmission of 48 K bits per second employed in packet switching networks. Therefore, it is preferable to employ a packet-type terminal device (PT) and a domestic station data circuit terminating unit (DSU) for the MODEM 43, the NCU 44 in the transmitter and the NCU 70, the MODEM 71 in the receiver. It is also possible to transmit voice data by means of the packet multiplex system after real-time compression of voice signals into the rate of 2 to 4 K bits per second by the use of a linear prediction analysis system or a LSP (Linear Spectrum Pair) system. As for transmission of picture data, the rate of 1200 bits per second may be employed in the transmitter, and the rate of 9600 bits per second or the rate of 48 Kbits per second may be employed in the receiver only.

A compression transmission system of monitored pictures at the time of change detection will be related in the following, which concerns the contents of the data compressor circuit 20 in FIG. 3 and the data expander circuit 68 in FIG. 5.

Figure 10B:
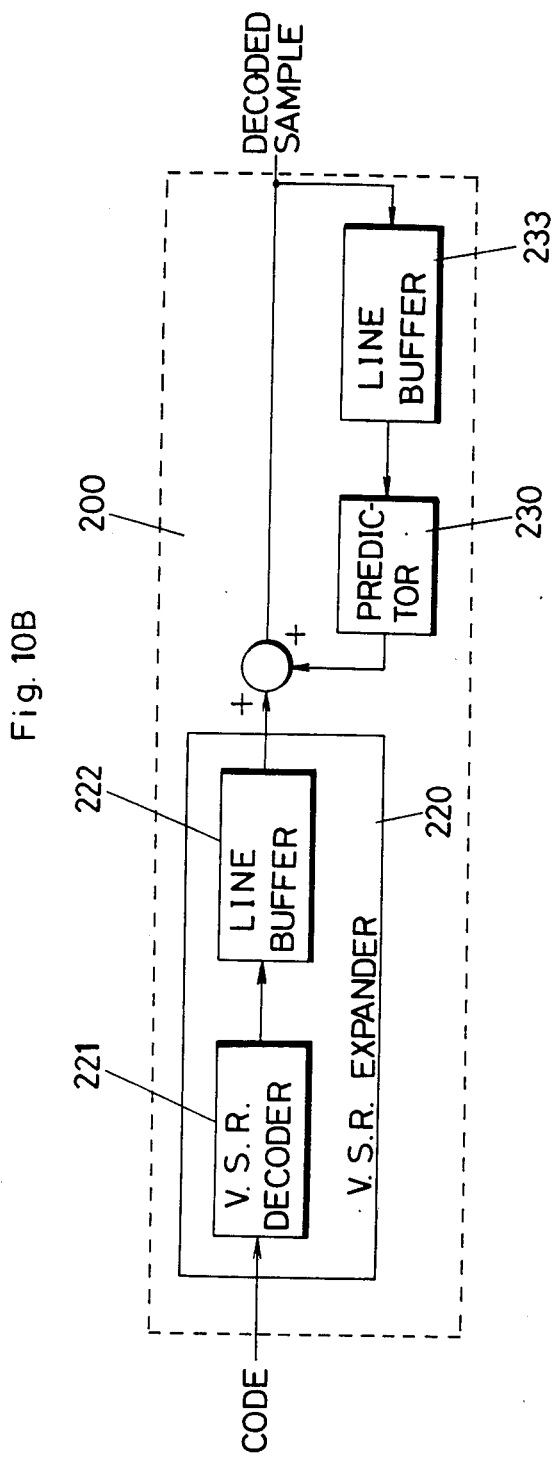

FIGS. 10A and 10B illustrate block diagrams of variable sampling rate encoding and decoding circuits respectively, and FIGS. 11A and 11B illustrate modified circuits of said encoding and decoding circuits in FIGS. 10A and 10B. FIGS. 2A and 12B illustrate a particular case of the circuits in FIGS. 11A and 11B, in which DPCM encoding and decoding of line-to-line prediction residuals are carried out.

By utilizing either pair of these encoding and decoding circuits, a whole of or a rectangular region of picture information concerning a monitored picture or a current picture at the time of change detection can be transmitted by either of the variable sampling rate coding system of line-to-line prediction residuals or the DPCM coding system of line-to-line prediction residuals, whereby the whole of or the rectangular region of picture information is compressed into 2 to 3 bits per picture element, and is transmitted with nearly the same picture quality as that of an original picture, which is as fine as picture quality in the case of 4 bits plane prediction. Therefore, it is possible to ascertain abnormal situations quickly with the aid of picture information.

Figures 14A, 14B:
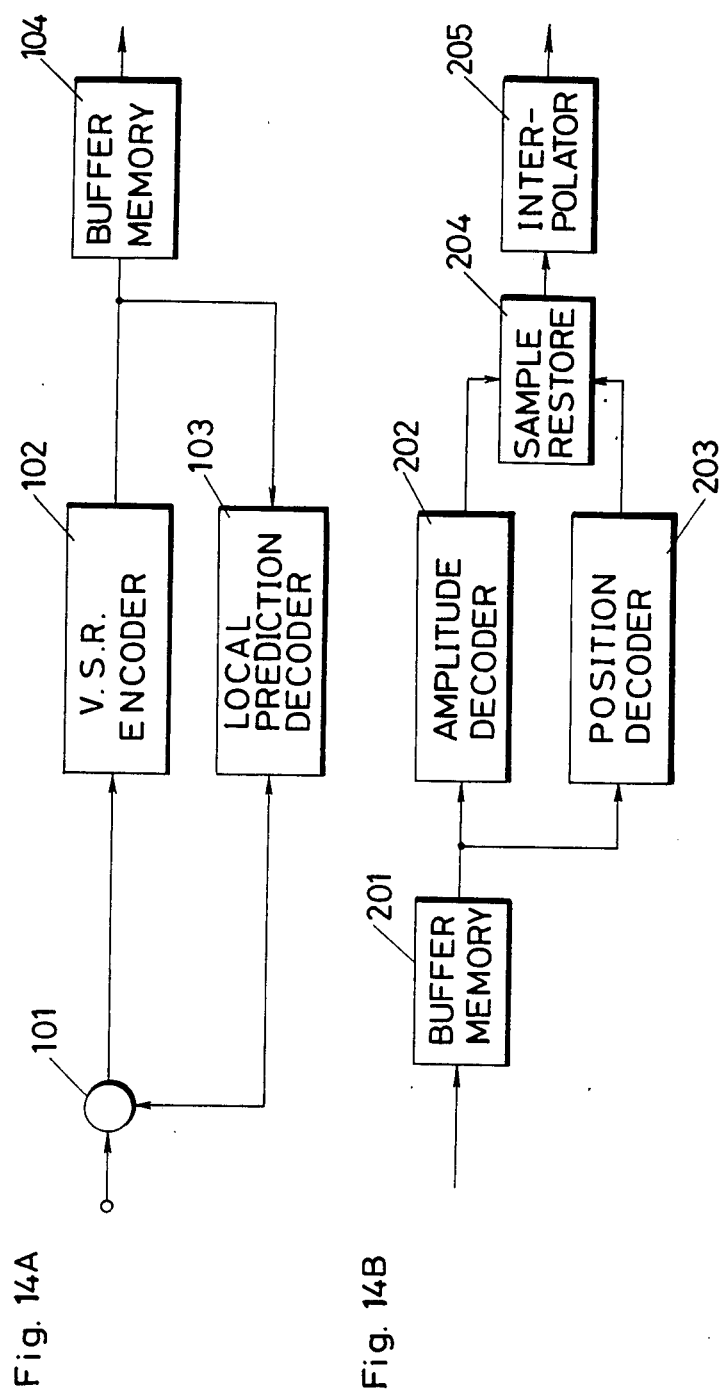
FIGS. 14A and 14B are block diagrams of the encoding and the decoding circuits prior to the circuits in FIGS. 10A and 10B.
Figure 20:
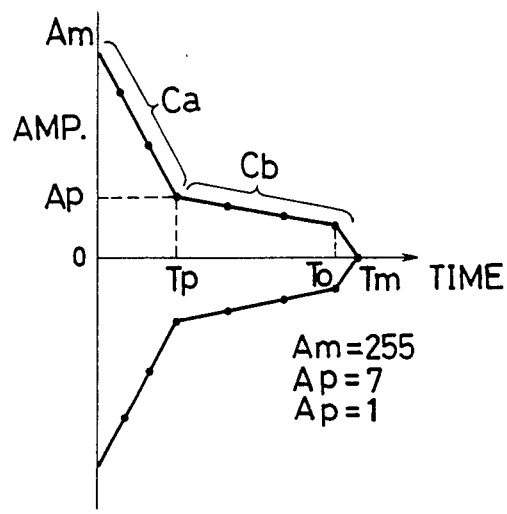

As for the variable sampling rate coding system, detailed explanation has been given by T. Kawada and K. Oumura in a paper titled "A variable sampling rate coding technique" published in Electronics and Communication Society papers in Japan of 75/2 Vol. 58-A No.2 at p. 97 to 204. According to the paper, a certain relationship called a quantization characteristic as shown in TABLE I between quantization values and sampling intervals is employed for compression and expansion within a scanning line. In transmission, only the quantization values or the quantization levels are transmitted in 5 bits codes for positive and negative values respectively, and the sampling intervals or the differential time values between respective sampling timing are not transmitted, whereby a conventional drawback of code amount increase in changeful portions of a picture can be eliminated and transmission band can be compressed by reducing sampling rate in changeless portions. In this system, transmitted picture quality becomes as fine as that of a 4 bits DPCM system at 2.8 bits per picture element. FIGS. 14A and 14B are explanatory block diagrams to help explain said variable sampling rate coding system. FIG. 14A illustrates a transmitter circuit, wherein a picture signal or a sample is compared in a differential circuit 101 with a predicted signal from a local prediction decoder circuit 103. A differential signal or a prediction residual signal obtained at the differential circuit 101 is encoded into a variable sampling rate code by the variable sampling rate encoder circuit 102 having quantization characteristic as shown in FIG. 20. The variable sampling rate code thus obtained is memorized in a buffer memory 104 and transmitted as a compressed code. The local prediction decoder circuit 103 decodes said code and generates the predicted signal given to the differential circuit 101.

In a receiver circuit as shown in FIG. 14B, the compressed code is memorized in a buffer memory 201. An amplitude decoder circuit 202 and a sampling position decoder circuit 203 cooperate together for restoring an amplitude and a sampling position of an original sample in accordance with the quantization characteristic as shown in FIG. 20. A decoded sample is obtained in a sample point restoring circuit 204 and interpolated in an interpolator circuit 205 to obtain a restored sample.

In this system, a compression rate at a section Cb is greater than that at a section Ca, though edge business which means errors in restored sampling points sometimes occurs at the section Cb.

The present inventors have developed the variable sampling rate coding system of line-to-line prediction residuals as shown in FIGS. 10A and 10B by appling said coding system in the paper to the coding of differences between a present scanning line and a previous scanning line. Said system in FIGS. 10A and 10B has been modified into a more preferable system as shown in FIG. 11A and 11B, and explanations will be given as to the latter system hereinbelow. In our system, 4 bits quantization characteristic codes are employed which have a quantization characteristic as shown in TABLE II and comprises positive and negative signs, and picture quality transmitted at 3 bits per picture element becomes nearly the same as that of an original picture, which is better than the case of 4 bits plane prediction.

In the circuit illustrated in FIG. 11A, a differential circuit 131 calculates residuals between a line-to-line predicted picture signal and a sampled picture signal, which are scaled up, if necessary, by a multiplier 140 having a multiplication coefficient M1. A variable sampling rate compressor circuit 110 compresses residuals of the secondary prediction into the quantization characteristic code along a line direction vertical to said line-to-line prediction residuals.

A zero code compressor circuit 150 compresses said quantization characteristic code into a zero compressed code in accordance with a zero code / zero line compression characteristic as shown in TABLE III. The zero compressed code comprises transmission codes (F1 to FE) showing the number of zero codes or the number of lines having zero codes only, and 8 bits transmission codes (0 to EF) which respectively include a pair of 4 bits quantization characteristic codes or changed codes other than zero codes. Said zero code means such code as the residuals of secondary prediction of the quantization characteristic code is zero. In order to transmit changed regions only, it is sometimes the case that a transmission code (FD) of the zero compressed code is utilized to show that a set of the following 8 bits data means an initial value of prediction of a changed region, and a transmission code (FE) is utilized to show termination of the changed region.

In the transmitter as shown in FIG. 11A, said quantization characteristic code is expanded in a variable sampling rate expander circuit 120, mixed in an interpolation synthesis circuit 132 with a memorized value in a line buffer 133, and registered into a prediction circuit 130 for prediction of a next line. The line buffer 133 is inserted in a feedback loop from the output of the predictor circuit 130. A prediction coefficient of the predictor circuit 130 may be set at one. The interpolation synthesis circuit 132 is provided for restoring sampling data which are thinned out at a certain intervals back to original sampling data. For instance, the circuit 132 restores a picture having 64 multiplied by 64 picture elements to an original picture having 256 multiplied by 256 picture elements, when picture elements are thinned out such that one picture element is left in four picture elements in the original picture. Therefore, in the present embodiment, even if picture data of the changed region that is changed as compared with a background picture having 256 multiplied by 256 picture elements are transmitted with one picture element left in four picture elements, a rough picture is restored by means of interpolation as to the chaged region, which is synthesized with the background picture of 256 multiplied by 256 picture elements.

In the receiver as illustrated in FIG. 11B, a zero code expander circuit 250 expands said zero compressed code back into the quantization characteristic code, which is restored to the line-to-line prediction residuals in a variable sampling rate expander circuit 220. Said line-to-line prediction residuals are restored into a picture of one line size by utilizing a loop comprising a predictor circuit 230 and a line buffer 233. The restored picture may be scaled down, if necessary, by a divider circuit 240 having dividing coefficient M1.

For instance, when each frame memory has the size of 6 bits per picture element, it is preferable to set the scale factor M1 at 4. At this occurrence, sampled data are shifted up by 2 bits in the multiplier circuit 140, calculated as data having the size of 8 bits per picture element, and shifted down by 2 bits in the divider circuit 240, whereby calculation accuracy is improved and picture quality becomes better than that obtained by calculation of data having the original size of 6 bits per picture element.

Instead of said 2 bits shifting up or shifting down, the following hardware can be employed for realizing the same effect. For instance when a 6 bits A/D converter and a 6 bits D/A converter are employed, the 3rd to the 8th bit data lines among the 1st to the 8th bit data lines of a data bus of a CPU are connected to data lines of a 6 bits frame memory, or the upper 6 bits data lines of a 8 bits frame memory are connected to said 6 bits A/D converter or D/A converter, whereby the lower 2 bits data becomes zero when the frame memory is read or written.

When all the sampling intervals of said quantization characteristic are set at 1 in said variable sampling rate coding system of line-to-line prediction residuals, the system becomes equivalent to the DPCM system of line-to-line prediction residuals as illustrated in FIGS. 12A and 12B. In this system, a quantization characteristic as shown in TABLE IV is employed, whereby picture quality at 3 bits per picture element becomes nearly the same as that of an original picture, which is better than the case of 4 bits plane prediction. In a quantization characteristic as shown in TABLE II, errors in a gradation direction are within plus/minus 1 by amplitude differential values. When there are contours or edges at the position where the time differential value is 2, slight errors in the amplitude are caused by an overload, though they hardly stand out. In a quantization characteristic as shown in TABLE IV, a time differential value is set at 1. Errors in a gradation direction are increased up to plus/minus 4 by amplitude differential values, which cause slight noises, though it is practical enough when upper 6 bits data among 8 bits data are employed as valid data.

Figure 19:
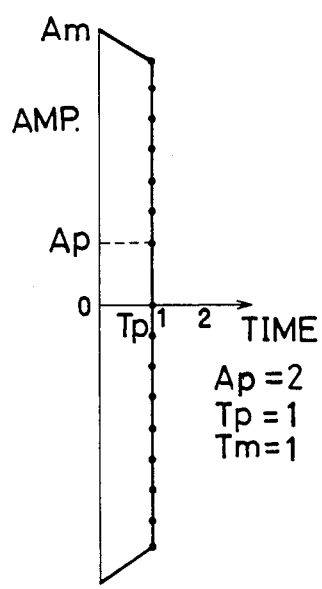
Figure 18:
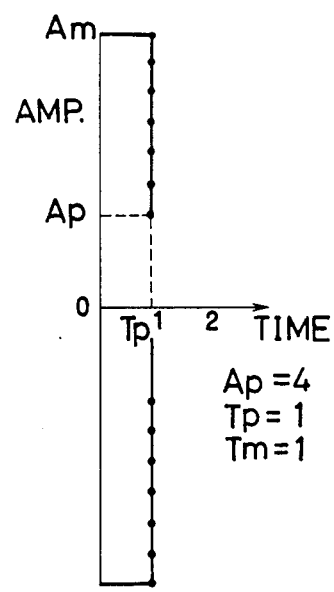

A quantization characteristic illustrated in FIG. 18 corresponds to that of TABLE IV, and a quantization characteristic illustrated in FIG. 19 corresponds to that of TABLE V.

In the DPCM system of line-to-line prediction residuals or in the variable sampling rate coding system of line-to-line prediction residuals, prediction residuals are concentrated upon zero and quantization errors is reduced as compared with a primary prediction system or a plane prediction system. It is because line-to-line prediction is a secondary prediction system comprising prediction within a scanning line and line-to-line prediction whose prediction directions are perpendicular to one another. In addition, picture quality is improved in the line-to-line prediction system owing to less edge business which is characteristic of a variable sampling rate coding system, because prediction errors from sample data or an original picture are calculated as to respective lines which prevent errors to propagate in the line-to-line direction.

It is preferable to overlap regions of the quantization values or the amplitude differential values as to different sampling intervals or as to the different time differential values, and to employ a quantization characteristic code corresponding to combination of the quantization values and sampling intervals for compression coding, whereby the quantization values can take further various values when the time differential values are large, which makes following ability as to contours and edges better and reduces edge business.

It is also preferable to multiply, by a predetermined value comprising one, a minimum quantum value of sampled digital data in an input portion of a predictor circuit in order to improve calculation accuracy. For instance, when said digital data have data size of 6 bits, said predetermined value may be set at 4, as suggested before. By means of said multiplication, a minimum quantum value of compression quantization value, which determines a permissible value of prediction residuals, can be set at a value that is not greater than a value of an original permissible amplitude error of said sampling digital value multiplied by a predetermined value and that is greater than an original minimum quantum value of said sampled digital value, whereby picture quality can be improved even at high compression rate. For instance, when said minimum quantum of quantization value for compression quantization has a range of plus/minus 4 and said original permissible amplitude error has a range of plus/minus 2, said predetermined value for multiplication of the latter is set at 4.

Figure 13A:
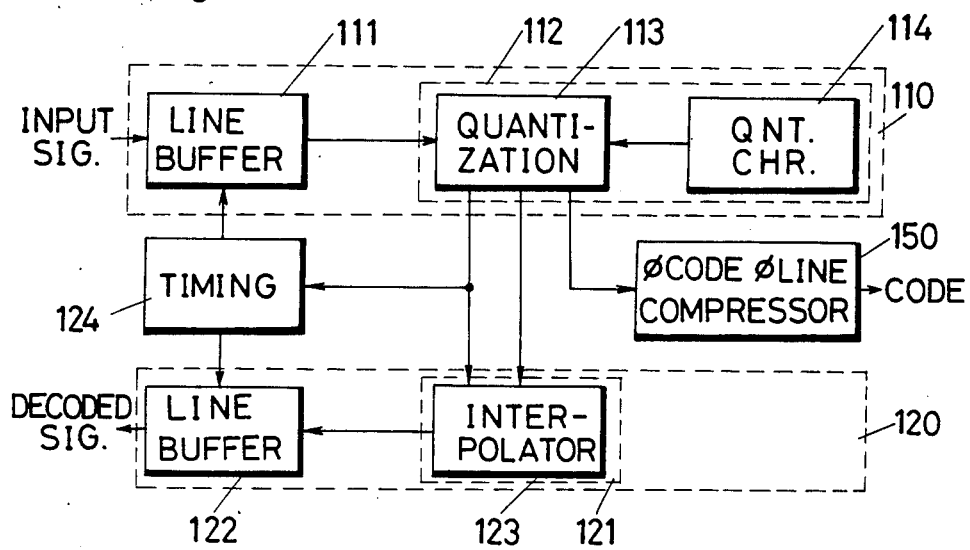
FIGS. 13A and 13B are block diagrams showing respectively main parts of the encoding and the decoding circuits in FIGS. 11A and 11B.
Figure 13B:
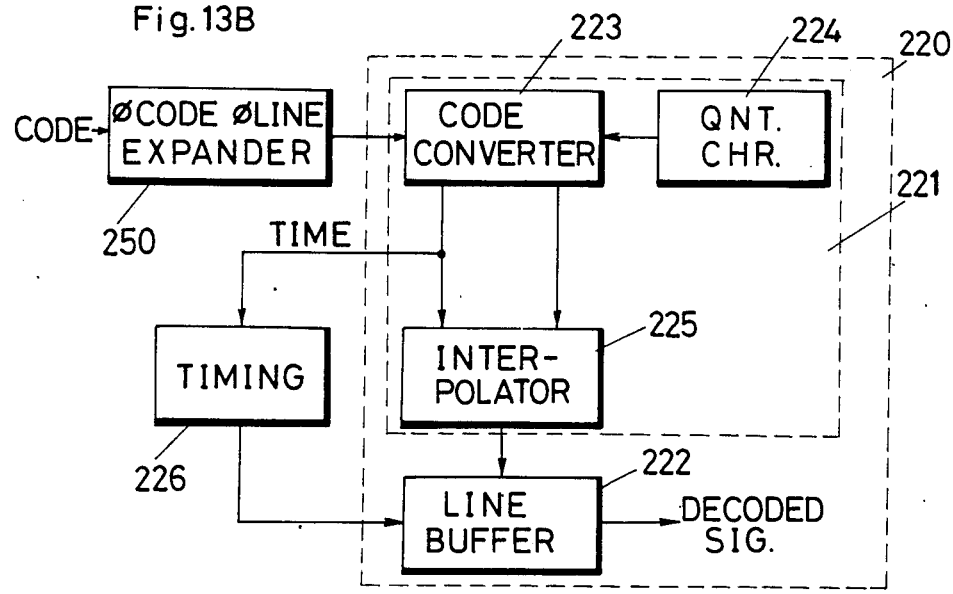

FIGS. 13A and 13B illustrate schematic diagrams of circuits corresponding to main portions of the circuits illustrated in FIGS. 11A and 11B respectively, wherein corresponding parts are shown by the same reference numbers. As shown in FIG. 13A, the variable sampling rate encoder circuit 112 comprises a quantization circuit 113 and a quantization characteristic table 114. The variable sampling rate decoder circuit 121 comprises an interpolator circuit 123 for interpolation and restoration of prediction residual signals in accordance with time differential values and amplitude differential values from the quantization circuit 113. A timing circuit 124 is provided for determining timing of writing and reading of line buffers 111 and 122. Quantization characteristics are memorized in the quantization characteristic table 114.

As shown in FIG. 13B, the variable sampling rate decoder circuit 221 comprises a code converter circuit 223, a quantization characteristic table 224, and an interpolator circuit 225. The code converter circuit 223 converts input codes into time differential values and amplitude differential values in accordance with the quantization characteristic table 224. The interpolator circuit 225 restores prediction residual signals by interpolation. The restored signals are sent to said decoding loop comprising predictor circuit 230 and the line buffer 233 via the line buffer 222. A timing circuit 226 is provided for determining timing of writing and reading of the line buffer 222.

Figure 15:
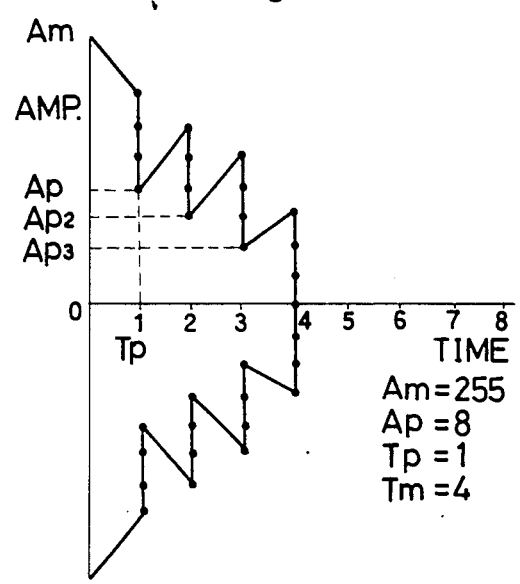
FIG. 15, FIG. 16, FIG. 17, FIG. 18, and FIG. 20 are respectively graphical representations showing quantization characteristics which may be employed in the above encoding and decoding circuits.
Figure 16:
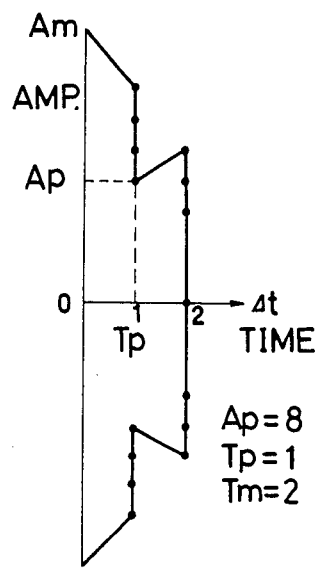
Figure 17:
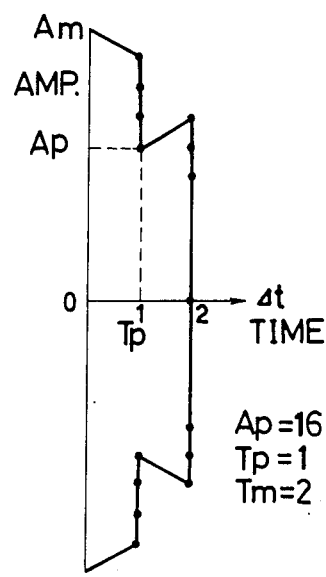

As for the contents of the quantization characteristic tables 114 and 224, quantization characteristics as illustrated in FIGS. 15 to 17 may be employed in order to enhance compression rate. When the amplitude differential value is below a constant value Apn, the quantization circuit 113 reads a sample at the position having a time differential value increased by a constant interval Tpn+1 from the line buffer 111. In FIG. 13A, an input signal is a prediction residual signal between said sample and a predicted value, which is predicted from a restored picture element previous to said sample by sigma Tpn+1 or an n− times repeated addition of time differential value Tpn+1. When said input signal is converted into a quantization amplitude differential value in the quantization circuit 113, said input signal is coded into a quantization characteristic code determined by combination of the time differential value and the amplitude differential value such that either of a greater value or a smaller value than said constant value Apn can be selected as to a quantization amplitude differential value, as shown in TABLE VI and TABLE VII. If conventional art is employed in the above case, amplitude values or quantization levels include overlapped codes.

In FIG. 16 corresponding to TABLE VI, the constant value Ap is equal to 8, and the constant value Tp is equal to 1, and the time differential value can take either of 1 or 2. So, the time differential value is set at 2 when the amplitude differential value is smaller than Ap(=8). For instance, when the time differential value is 2 and the amplitude differential value is equal to or larger than 16, a quantization code "A" (expressed hex-a-decimally) is obtained as coded output. And when the amplitude differential value is within 4 to 7, a quantization code "8" is obtained as coded output. As for the amplitude differential values "16" and "8", the time differential value can take either of 1 or 2, which are overlapped values. Nevertheless, they are coded into different quantization codes, which is a characterisic of the present embodiment.

The signal below the constant value Ap at the time differential value 1 is likely to become a smaller amplitude value than the constant value Ap at the time differential value 2, considering probability. However, as to uneven portions made by sharp edges or human faces etc., said signal is likely to become larger amplitude differential value than the constant value Ap. Therefore, the amplitude differential value 8 equal to the constant value Ap or the amplitude differential value 16 greater than the constant value Ap are provided as to the time differential value 2, whereby errors in the gradation direction range plus/minus 4 by amplitude differential values as to the time differential value 2, resulting in a higher compression rate of 2 bits per picture element and picture quality equivalent to or better than that obtained at 3 bits per picture element or 4 bits per picture element by TABLE IV or TABLE V.

In a quantization characteristic shown in FIG. 17 corresponding to TABLE VII, the constant value Ap is equal to 16, and the constant interval Tp is equal to 1, and the time differential value can take either of 1 or 2. So, the time differential value is set at 2, when the amplitude differential value at the time differential value 1 becomes smaller than Ap. An amplitude differential value 16 which is equal to the constant value Ap and an amplitude differential value 32 which is greater than the constant value Ap are provided as to the time differential value 2, whereby errors in the gradation direction range plus/minus 8 by amplitude differential value as to the time differential value 2, resulting in a higher compression rate of 1.5 bits per picture element and less deterioration of picture quality caused by edge business etc. concerning human features etc.

Said compression rate means code amount converted into a bit number per picture element after 2 stages of compression process comprising a compression coding by said quantization characteristic and a compression coding by said zero code / zero line compressor circuit 14. As for evaluation of picture quality, an observer compared restored pictures having different quantization characteristics with each other and evaluated them subjectively. As for original pictures, those including the whole appearance of a human were used, and the observer evaluated how much deterioration occurred by compression as to features of a human face. When an original picture was a portrait of a human face with simple background or white monotonous background, the compression rate of the quantization characteristic illustrated in FIG. 16 corresponding to TABLE VI was approximately 1.0 bit per picture element, and the compression rate of the quantization characteristic illustrated in FIG. 17 corresponding to TABLE VII was approximately 0.6 bits per picture element. Said original picture had data size of 8 bits per picture element and had 256 multiplied by 256 picture elements.

Figure 21:
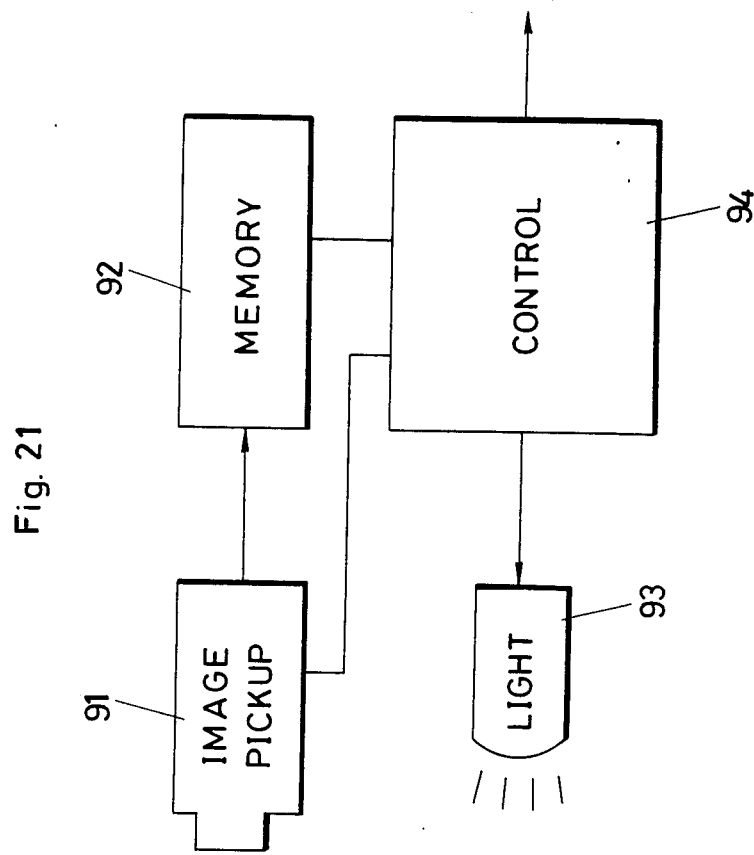
FIG. 21 is a schematic block diagram showing a circuit of a second embodiment of the present invention.
Figure 22:
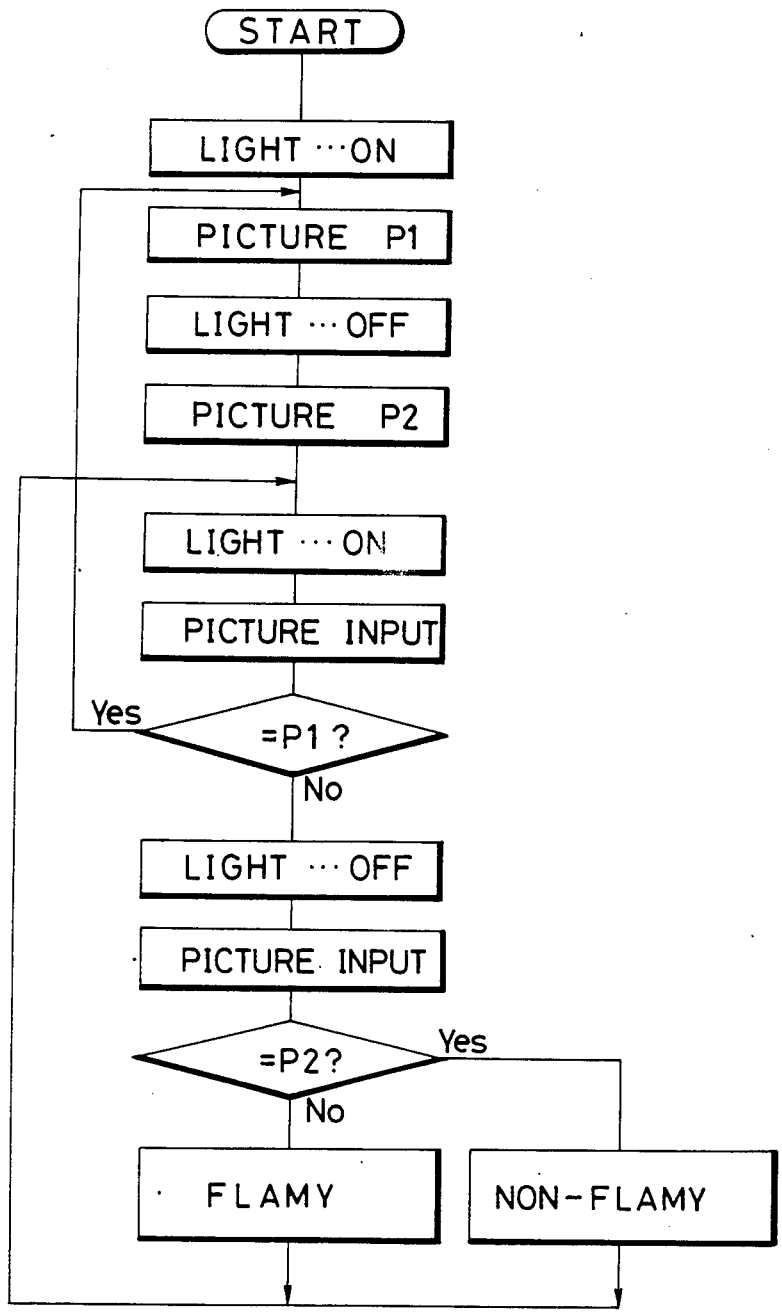
FIG. 22 is a flow chart showing the operation of the second embodiment.

FIG. 21 illustrates a block diagram of a visual image sensor system in accordance with a second embodiment of the present invention. FIG. 22 illustrates a flow chart for an explanation of an operation of the second embodiment. In the present embodiment, a lighting unit 93 which illuminates an object of an image pickup unit 91 by visible spectrum or infrared ray etc. and a controller unit 94 which switches the lighting unit 93 on and off are provided in order to registrate picture data with and without illumination in normal situations into a memory unit 92 as standard picture data, which correspond to the primary extracted standard data D1*i* in FIG. 1.

Current picture data with illumination and current picture data without illumination are compared with the respective standard picture data by comparing means included in the controller unit 94. When changes are detected only in the picture data with illumination, the controller unit 94 generates a detection signal of non-flamy abnormal situations. When changes are detected in both of the picture data with and without illumination, the controller unit 94 generates a detection signal of flamy abnormal situations. Namely, in the present embodiment, the controller unit 94 discriminates flamy abnormal situations such as a fire from other non-flamy abnormal situations by utilizing the fact that flamy abnormal situations should make light sources of themselves, whereby it becomes possible to judge whether or not abnormal situations are caused by a fire.

Figure 23A:
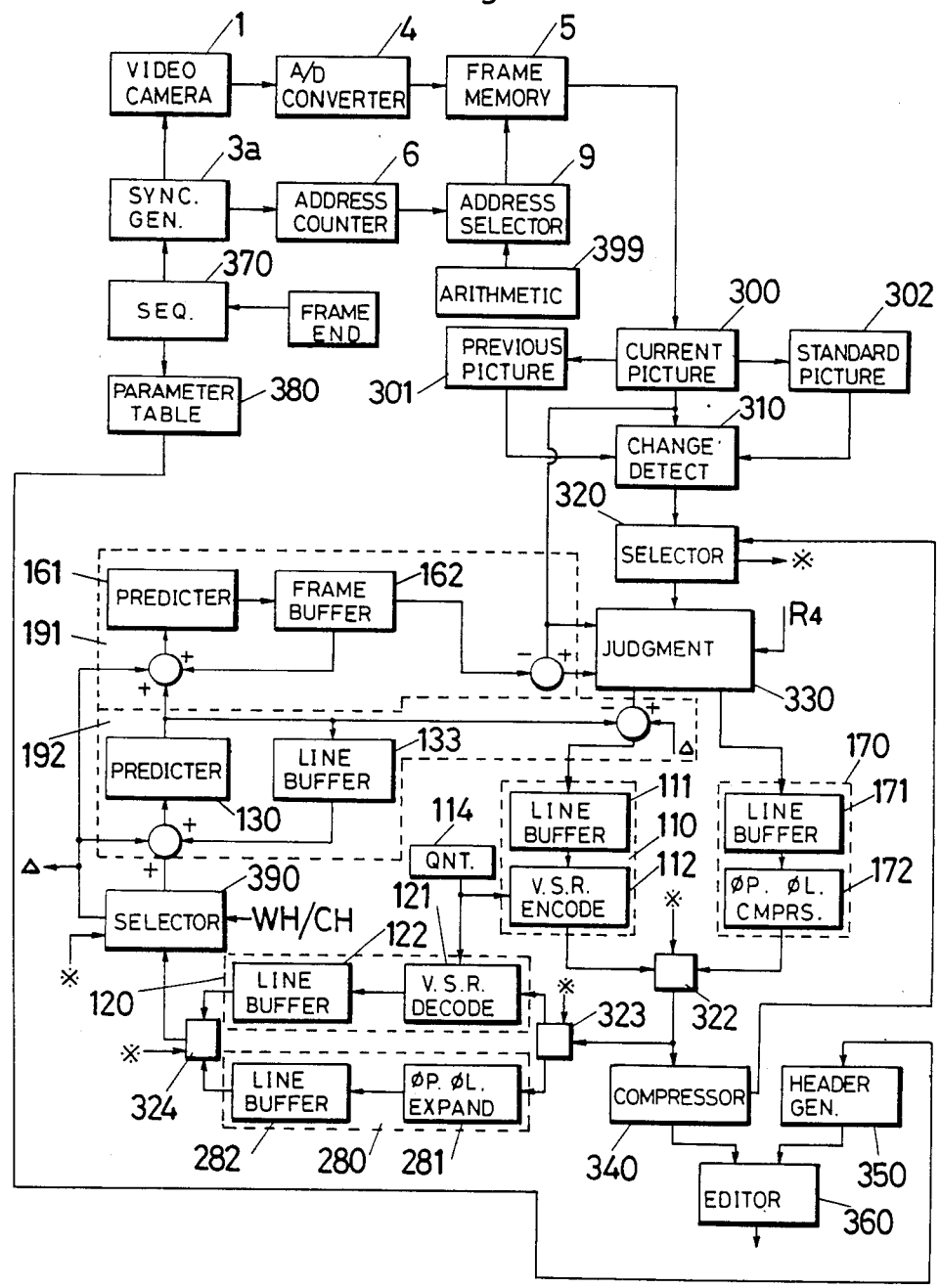
FIGS. 23A and 23B are block diagrams showing respectively a transmitter circuit and a receiver circuit employed in a third embodiment of the present invention.
Figure 23B:
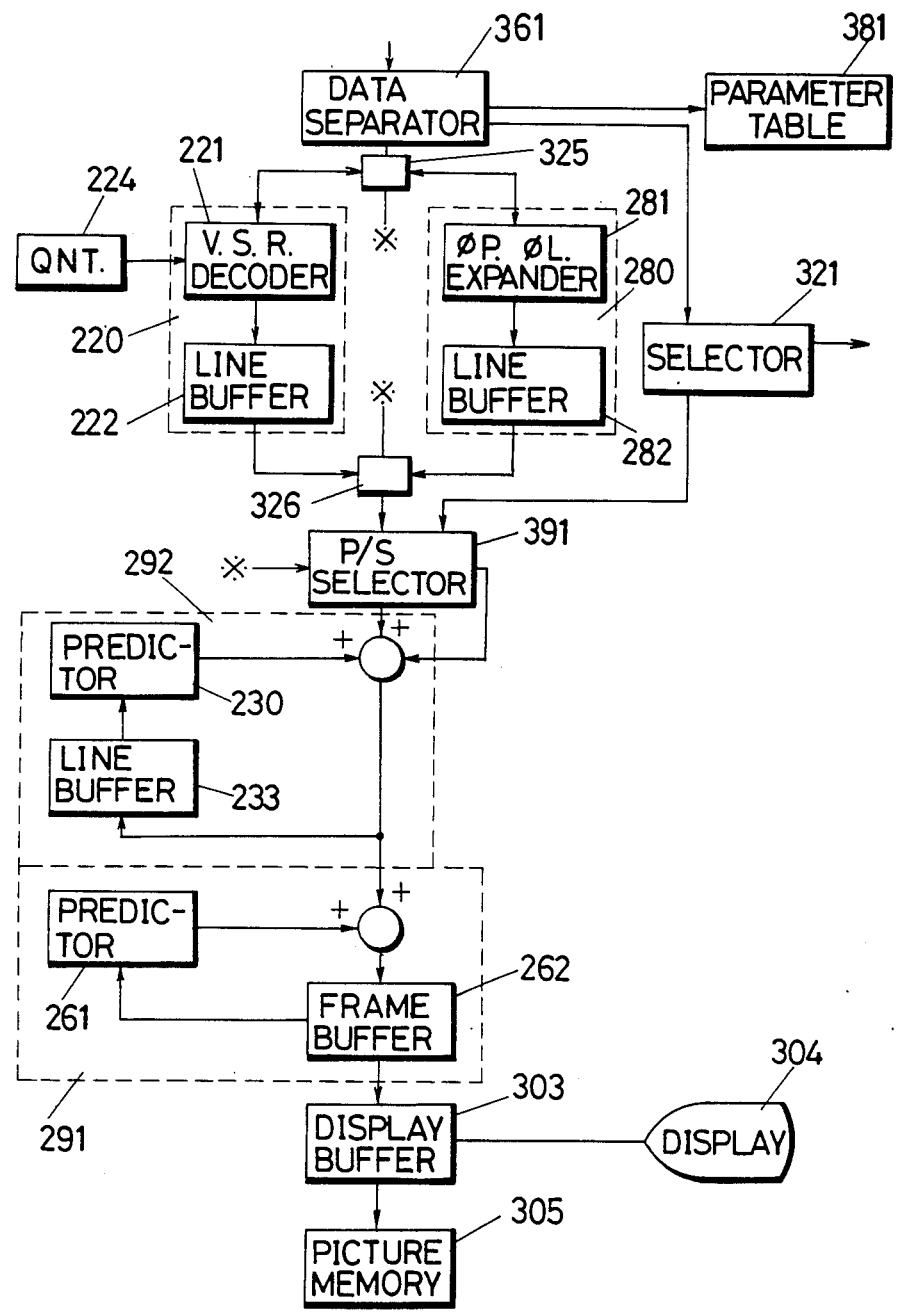
Figure 24:
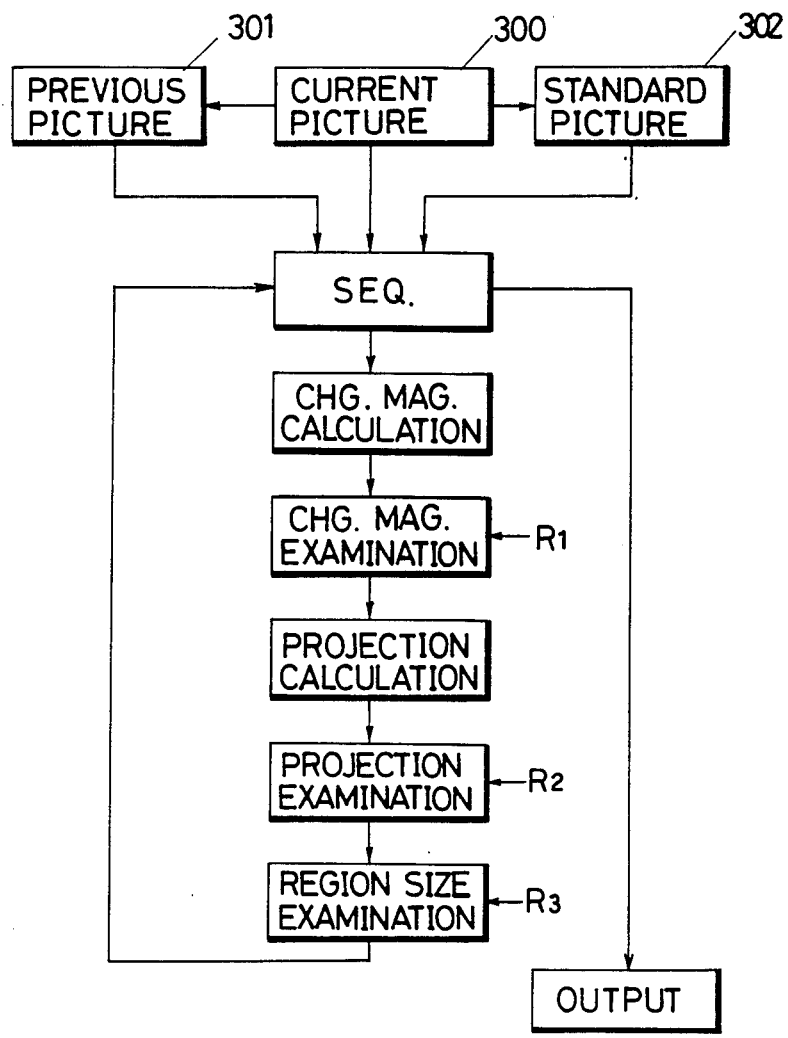
FIG. 24 is a flow chart to help explain the operation of a change detector circuit employed in the third embodiment.

Referring now to FIGS. 23 to 25, there is illustrated a third embodiment of the present invention. In this embodiment, compression transmission system of monitored pictures at the time of change detection will be related. Particularly, picture information transmission of changed portions between frames will be related, which is based on frame-to-frame prediction residuals between a previous picture frame or a predicted picture frame and a current picture frame.

FIG. 23A illustrates a circuit of a visual image sensor including a picture transmitter, and FIG. 23B illustrates a circuit of a correponding receiver. In FIG. 23A a video camera 1, an A/D converter 4, a frame memory 5, a synchronous signal generator circuit 3, and an address counter 6 are the same as those described in FIG. 1. The frame memory 5 can be accessed by an arithmetic controller circuit 399 such as a CPU, and an address selector 9 selects either of an address signal from the address counter 6 or an address signal from said arithmetic controller circuit. A current picture frame buffer 300, a previous picture frame buffer 301, and a standard picture frame buffer 302 respectively memorize a current picture that is currently monitored, a previous picture that is previous to the current picture, and a plurality of standard pictures.

A change detector circuit 310 in FIG. 23A can be regarded as corresponding to the primary change detector circuit 10 in FIG. 1, or comprising the primary change detector circuit 10 in FIG. 1, the secondary change detector circuit 20 in FIG. 3, and the pattern verification circuit 30 in FIG. 4. Namely, the change detector circuit 310 comprises processing illustrated in FIG. 24, in which a calculation of change magnitude of respective picture element between a current picture and a previous picture or between a current picture and standard pictures, an examination of change magnitude of respective picture elements as compared with said standard value R1, a calculation of projection, an examination of projection of a changed region as compared with said standard value R2, an examination of a changed region size are sequentially carried out under the control of the sequencer 370. A result of said processing, such as X and Y coordinate of a changed region, is obtained as an output of the change detector circuit 310.

Processing which starts at a compression manner selector circuit 320, passing through a changed picture element judgment circuit 330, and reaching a code compressor circuit 340, a code header generator circuit 350 and a packet data editor circuit 360 in FIG. 23A can be regarded as corresponding to processing in the data compressor circuit 40 and coder circuit 42 in FIG. 3. Similarly, processing which starts at a packet data separator circuit 361, passing through a primary/secondary selector circuit 391, and reaching a display picture frame buffer 303 in FIG. 23B can be regarded as corresponding to processing in the decoder circuit 73, the data expander circuit 79, and the frame memory 81 in FIG. 5.

In FIG. 23A, picture transmission is controlled by a sequencer 370 such that a rough picture, a semi-fine picture, and a fine picture are transmitted in this order when a fresh picture is transmitted. In other words, a transmitted picture is made distinct gradually from a rough one to a fine one, whereby a phase of changes can be transmitted as soon as possible. For instance, said rough picture may have 64 multiplied by 64 picture elements, and said semi-fine picture may have 128 multiplied by 128 picture elements, and said fine picture may have 256 multiplied by 256 picture elements.

In the predicted picture frame buffer 162, the same picture is obtained by restoration processing as the picture in the predicted picture frame buffer 262 of the receiver in FIG. 23B. In the case of the rough picture having 64 multiplied by 64 picture elements or the semi-fine picture having 128 multiplied by 128 picture elements, picture element values which are not transmitted are obtained by interpolation in vertical and/or horizontal directions.

A parameters table 380 generates various parameter such as the number of transmitted picture elements as to respective pictures used for said gradual distinction improvement or gradual resolving, compression parameter necessary for selecting compression manner to be mentioned hereinafter, and selector parameter for selecting a whole picture transmission and a changed portion transmission or a block transmission, etc.

In order to transmit information of a monitored picture or a current picture at the time of change detection, the changed picture element judgment circuit 330 reads a current picture frame buffer 300, and takes in a frame-to-frame residual which is an error or an absolute value of a difference between the current picture and a predicted picture in the predicted picture frame buffer 162 that is predicted on the basis of a previous picture frame that has been already transmitted. The changed picture element judgment circuit 330 is provided with a standard value R4 for changed picture element judgment which is smaller than the standard value for change detection of picture elements in the change detector circuit 310. The changed picture element judgment circuit 330 determines changed picture elements which are greater than the standard value R4 and zero picture elements which are smaller than the standard value R4.

Values of the zero picture elements of frame-to-frame residuals and/or a current picture frame are set at zero. If necessary, one or two zero picture elements surrounded by changed picture elements are converted into changed ( picture elements by means of propagation and degeneration of the changed picture elements, and one or two changed picture elements surrounded by zero picture elements are converted into the zero picture elements, whereby solitary zero picture elements within changed picture elements and solitary changed picture elements within zero picture elements are eliminated.

The frame-to-frame residuals or values of changed picture elements of the current picture frame are compressed by a DPCM system of line-to-line prediction residuals, or a variable sampling rate coding system of line-to-line prediction residuals, or a primary variable sampling rate coding system, whereby changed regions or changed picture elements are transmitted with high efficiency.

A compression manner selector circuit 320 is provided for selecting and switching compression manners in accordance with calculated ratio of a changed region to a previous picture. Said ratio is calculated by considering, for instance, the size of changed region of said primary change detection, the number of picture elements changed between frames whose changes are greater than the standard value R4 judgment, and the number of codes for compression and expansion of zero picture elements and zero lines, etc. Standard values for switching the compression manners are set at 50% and 20%. When changed picture elements are judged to be less than 20% on the basis of the size or the width of a rectangular region obtained by change detection, values of changed picture elements within the current picture frame buffer 300 are directly compressed and expanded as to zero picture elements and zero lines. When changed picture elements ranges from 20% to 50%, values of changed picture elements of the current picture frame buffer 300 or the changed picture elements of frame-to-frame residuals are compressed and expanded as to zero codes and zero lines by a primary DPCM system or a primary variable sampling rate coding system. When changed picture elements are larger than 50%, a whole picture of the current picture frame buffer 300 or a whole picture of frame-to-frame residuals are compressed and expanded as to zero codes and zero lines by a secondary DPCM system or a secondary variable sampling rate coding system.

When the changed picture elements of the current picture frame buffer 300 are transmitted, a data passage through a changed picture element line buffer 171 and a zero picture element / zero line compressor circuit 172 is selected by a switching circuit 322. At this occurrence, a zero picture element / zero line expander circuit 181 and a changed picture element line buffer 182 is selected by switching circuits 323 and 324.

When the frame-to-frame residuals are transmitted, a data passage through a prediction residual line buffer 111 and a variable sampling rate encoder 112 is selected by the switching circuit 322. At this occurrence, a data passage through a variable sampling rate decoder circuit 221 and a prediction residual line buffer 222 is selected by the switching circuits 323 and 324. Both of the encoder 112 and the decoder 221 are provided with a same quantization characteristic. Said switching circuit 322, 323, and 324 are under the control of the compression manner selector circuit 320.

A primary/secondary selector circuit 390 switches said primary and secondary prediction by selecting whether or not a secondary predictor circuit 192 is inserted into data passage. A primary predictor circuit 191 comprises a frame-to-frame predictor circuit 161 and said predicted picture frame buffer 162. The secondary predictor circuit 192 comprises a predictor circuit 130 and a prediction residual line buffer 133 based on compression and expansion in scanning lines.

Said zero picture element and zero line compression system is such system as explained in the following. The zero picture element means such picture element that line-to-line residual thereof is smaller than said standard value R4. Values of zero picture elements of frame-to-frame residuals and the current picture frame are set at zero, as shown in FIGS. 25A and 25B. Data taken into a changed picture element line buffer 171 from the changed picture element judgment circuit 330 are compressed by a zero picture element and zero line compressor circuit 172 in accordance with TABLE VIII.

Said compressed data are expressed in 8 bits codes whose upper 2 bits indicate meanings thereof. When said upper 2 bits are "00", the code means the changed picture element. When they are "01", the code means the number of zero picture elements. When they are "10", the code means the number of zero lines, i.e., lines whose picture elements are all zero picture elements. When they are "11", the code means the end of a line or the end of a frame.

In the lower 6 bits of the code, the frame-to-frame residual of the changed picture element or the picture element value of the current picture frame are transmitted as they are. As for the frame-to-frame residuals, the values of predicted picture frame added by the frame-to-frame residuals take the place of the values of predicted picture frame. As for the picture element values of the current picture frame, the values of the predicted picture frame of the changed picture elements take the place of the picture element values of the current picture frame. In this case, information of changed picture elements can be transmitted with high fidelity, when changed regions are as small as 10%.

The zero code / zero line compression is carried out in the following manner. The changed picture element judgment circuit 330 discriminates said changed picture elements from said zero picture elements and sets the values of the zero picture elements at zero. Values of the changed picture elements and the zero picture elements as to the frame-to-frame residuals or the current picture frame are compressed by a manner selected in the compression manner selector circuit 320, such as a secondary DPCM system of residuals of line-to-line prediction, a secondary variable sampling rate coding system of line-to-line prediction residuals, a primary DPCM system, or a primary variable sampling rate coding system. As for frame-to-frame residuals, transmission codes are generated in accordance with TABLE III. As for the values of the current picture frame, however, meanings of some of the transmission codes (e.g., FD and FE) are different from those shown in TABLE III.

In a transition from the zero picture element to the changed picture element, the value of the changed picture element is transmitted as an initial value of prediction by a changed picture element code (e.g., FD, xx). In a transition from the changed picture element to the zero picture element, a zero picture element code (e.g., FE) is transmitted as a termination value of prediction. The number of the zero codes whose prediction residuals are zero and the number of the zero lines whose picture elements are all zero codes are transmitted in a compressed code.

The code header generator circuit 350 attaches, to said transmission codes as explained in the above, code headers in correspondence with the respective frames in order to show the number of transmission picture elements, compression parameter, and selector parameter for selection of the whole picture transmission and the changed portion transmission. The packet data editor circuit 360 sends out said transmission codes together with said code headers as communication data. Said compression parameter comprises the quantization characteristics and prediction coefficients of the frame-to-frame predictor circuit 161, and can be selected by the sequencer 370 or the compression manner selector circuit 320. When said prediction coefficients are set at optimum values, prediction errors concentrate upon zero and quantization errors are reduced, which improves picture quality.

By selecting the quantization characteristics and the number of transmission picture elements under the control of the sequencer 370 and the compression manner selector circuit 320, a higher compression rate and a rough lattice size as compared with a sampling lattice size can be selected. At this occurrence, picture information of a rough picture, which recognizes general outlines of a changed portion of a picture, can be narrow-band transmitted after information compression.

In the receiver, said rough picture is displayed after interpolation. In the transmitter, too, said rough picture is interpolated, which is used for generating a predicted picture of a next picture frame which is to be transmitted in the next on the basis of a previous picture frame which has been already transmitted.

When instructions to request a fine picture or instructions to set transmission modes are received a, writing operation into the current picture frame buffer 300 for the renewal of the current picture is inhibited, and picture data within the current picture frame buffer 300 are fixed as the current picture frame. Then, frame-to-frame residual differences, which are errors between the current picture frame and predicted picture data based on a picture frame already transmitted, are narrow-band transmitted after information compression in accordance with a quantization characterstic of a lower compression rate. Repetition of said process allows the predicted value to approach an actual value, whereby the transmitted picture is made distinct gradually.

It is also possible to tranmit, after information compression, either of a current picture frame or frame-to-frame residuals, the latter being errors between said predicted picture and the current picture frame before transmission having fine lattice (i.e., the fine picture), whereby transmitted picture is made distinct gradually.

In addition, under the control of the sequencer 370 and the compression manner selector circuit 320, it is also possible to transmit, through a narrow-band channel and after information compression, either of a picture or frame-to-frame residuals of a changed region of a current picture frame which includes a change as compared with a background standard picture, said changed region being determined by coordinate of changed region detected by the primary change detection.

In the receiver as shown in FIG. 23B, said picture or said frame-to-frame residuals of the changed region are restored and converted into a normalized picture frame of a constant size, or displayed after interpolation. In the transmitter, too, said picture or said frame-to-frame residuals are interpolated, which are utilized for generating a predicted picture of a next picture frame to be transmitted in the next on the basis of a previous picture frame which has been already transmitted. The picture or the frame-to-frame residuals of said normalized picture frame are narrow-band transmitted after information compression, whereby it becomes possible to select a magnified display or an inserted display of the changed region, and gradual distinction improvement or gradual resolution thereof.

In order to insert contours among contours by a known contour insertion method for interpolated display, it is effective to set inserted values at greater values than an average of contour ingredients higher than an average of surrounding values, when upper/lower, left/right, or oblique picture elements are regarded as including contour ingredients.

FIG. 23B illustrates the receiver circuit, in which a packet data separator circuit 361 separates, from received communication data, the codes showing the number of transmission picture elements, compression parameter, and the selection of the whole/changed part of the picture, which are taken into a parameter table 381. A compression manner selector circuit 321 takes in compression manner data showing which of the zero picture element / zero line compression transmission system or the zero code / zero line compression transmission system is used. Under the control of the compression manner selector circuit 321, switching circuit 325 and 326 distribute communication data to expander circuits 220 and 280 corresponding to respective transmission system.

The expander circuit 280 comprises a zero picture element / zero line expander circuit 281 and a changed picture element line buffer 282. The expander circuit 220 comprises a variable sampling rate decoder circuit 221 and a prediction residual line buffer 222. The variable sampling rate decoder circuit 221 is provided with the same quantization characteristic as that of the decoder circuit 221 in the transmitter.

A primary/secondary selector circuit 391 determines whether or not the secondary predictor circuit 292 is inserted before the primary predictor circuit 291. The primary predictor circuit 291 comprises a frame-to-frame predictor circuit 261 and a predicted picture frame buffer 262. The secondary predictor circuit 292 comprises a predictor circuit 230 and a prediction residual line buffer 233.

A display picture frame buffer 303 memorizes a picture which is to be displayed on a display unit 304 such as a monitor CRT. If necessary, the picture in the display picture frame buffer 303 is stored in a picture memory 305 for a long term storage.

Figure 27A:
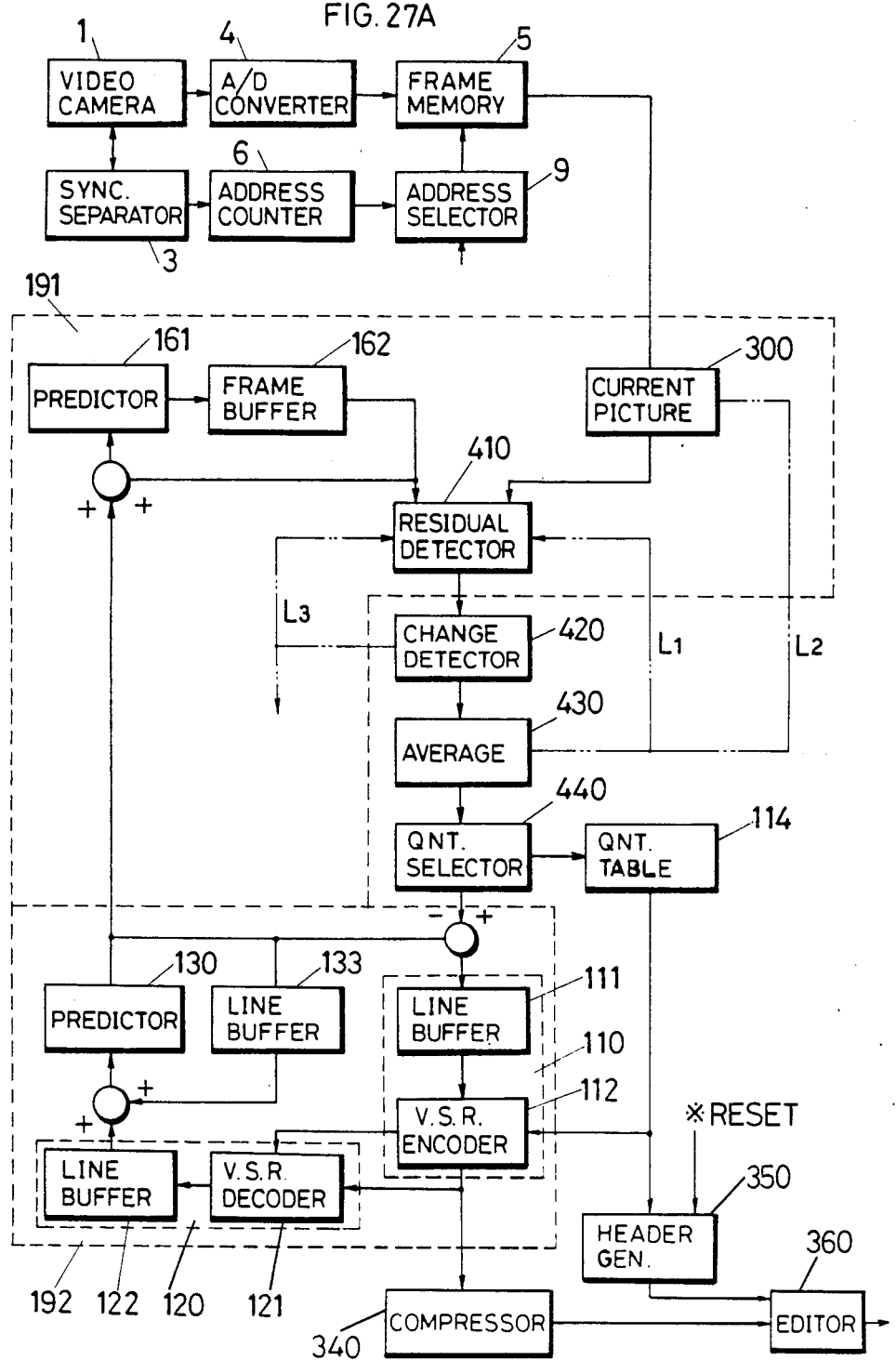
FIGS. 27A and 27B are block diagrams showing respectively a transmitter circuit and a receiver circuit employed in a fourth embodiment of the present invention.
Figure 27B:
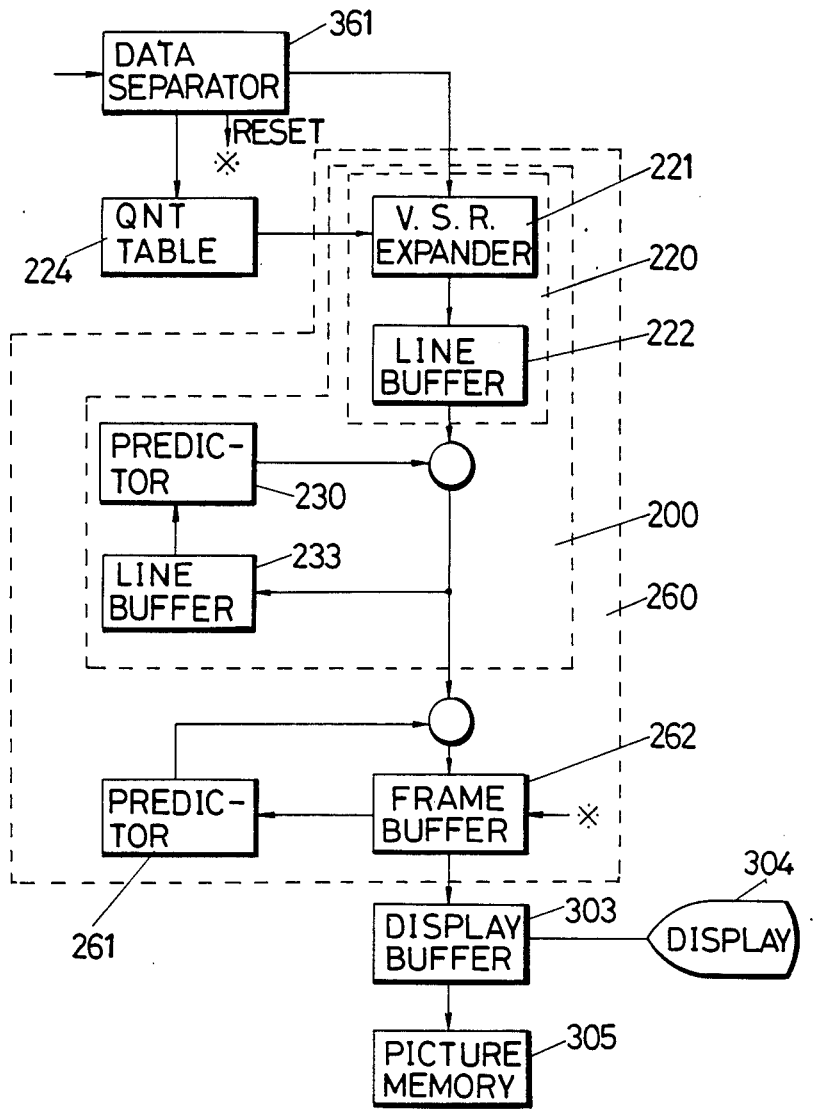

Referring now to FIGS. 27A and 27B, there is illustrated a fourth embodiment of the present invention, wherein explanation will be given only as to picture transmission system associated with said visual image sensor system. In FIG. 27A, a video camera 1, an A/D converter 4, a frame memory 5, a synchronous signal generator 3a, an address counter 6, an address selector 9, a code header generator circuit 350, a code compressor circuit 340, and a packet ( data editor circuit 360 are the same as those disclosed in the preceding embodiments. In FIG. 27B, a packet data separator circuit 361, a display picture frame buffer 303, a display unit 304, and a picture memory 305 are the same as those disclosed in FIG. 23B. Prediction coefficients of the frame-to-frame predictor circuit 161 are selectable. Within an interior feedback loop of the frame-to-frame predictor circuit 161, a predicted frame buffer 162 is included. Within an exterior feedback loop of the frame-to-frame predictor circuit 161, compression process and expansion process by a variable sampling rate coding system are included.

Figure 28:
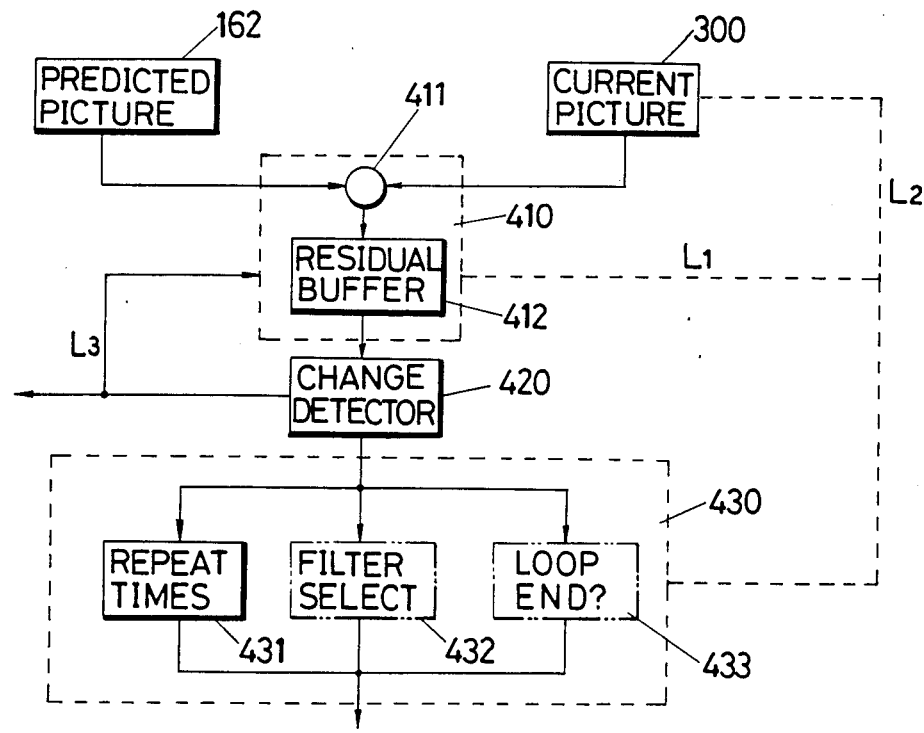
FIG. 28 is an explanatory block diagram to help explain the operation of a main part of the transmitter circuit in FIG. 27A.
Figure 29:
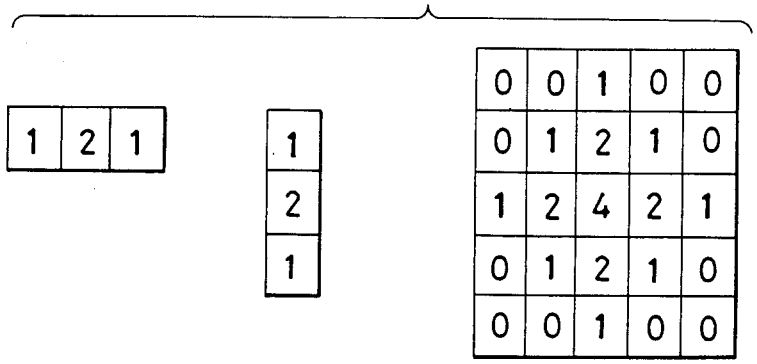
FIG. 29 is a schematic illustration to help explain the operation of a spatial filter which may be employed in the fourth embodiment.

A frame-to-frame residual detector circuit 410, a changed amount detector circuit 420, and an averaging circuit 430 in FIG. 27A and FIG. 28, which may be included within the changed picture element judgment circuit 330 in FIG. 23A, reduce the changed amount of the frame-to-frame residuals by making said spatial filter for averaging act upon the frame-to-frame residual as shown by L1 or upon the current picture frame as shown by L2 before transmission, when the changed amount of the frame-to-frame residuals is large. The frame-to-frame residual detector circuit 410 comprises a differential circuit 411 which calculates differences between the current picture frame buffer 300 and the predicted picture frame buffer 162; and a frame-to-frame residual frame buffer 412 which memorizes said calculated differences. The changed amount detector circuit 420 determines the changed amount of the frame-to-frame residuals by a sum total of the frame-to-frame residuals of the respective picture elements. Said spatial filter is selectable by a filter selector means 432 and repeatedly operable by a repeat times setting means 431 and averaging loop end judgment means 433 which are included in the averaging circuit 430, as shown in FIG. 28. After said reduction of the changed amount of the frame-to-frame residuals, the residuals of the frame-to-frame prediction of the changed picture elements are transmitted after compression coding by said compression process.

As the case may be, when the frame-to-frame residuals are transmitted, it is preferable to reset the predicted picture frame at zero as shown by L3; to transmit firstly the frame-to-frame residuals of the changed picture elements having low frequency ingredients; and to transmit secondly the frame-to-frame residuals of the changed picture elements having high frequency ingredients, whereby it becomes possible for the predicted values to approach the actual values, which allows said gradual improvement of distinction or resolution.

Said low frequency ingredients and said high frequency ingredients are selected by selecting the averaging spatial filters which act upon the current picture frame before transmission. Namely, at first, the previous picture frame, which has been already transmitted, is set at zero, and a spatial filter having high averaging ability acts upon the current picture frame before transmission, whereby said low frequency ingredients are extracted. Secondly, a spatial filter having low averaging ability acts upon the current picture frame, whereby said high frequency ingredients are extracted.

A quantization characteristic selector circuit 440 selects quantization characteristic and registers the same into a quantization characteristic table 114. The quantization characteristic table 114 supplies a variable sampling rate encoder circuit 112 and a variable sampling rate decoder circuit 121 with said selected quantization characteristic, which is also transmitted to the receiver via the code header generator circuit 350.

Figure 26A:
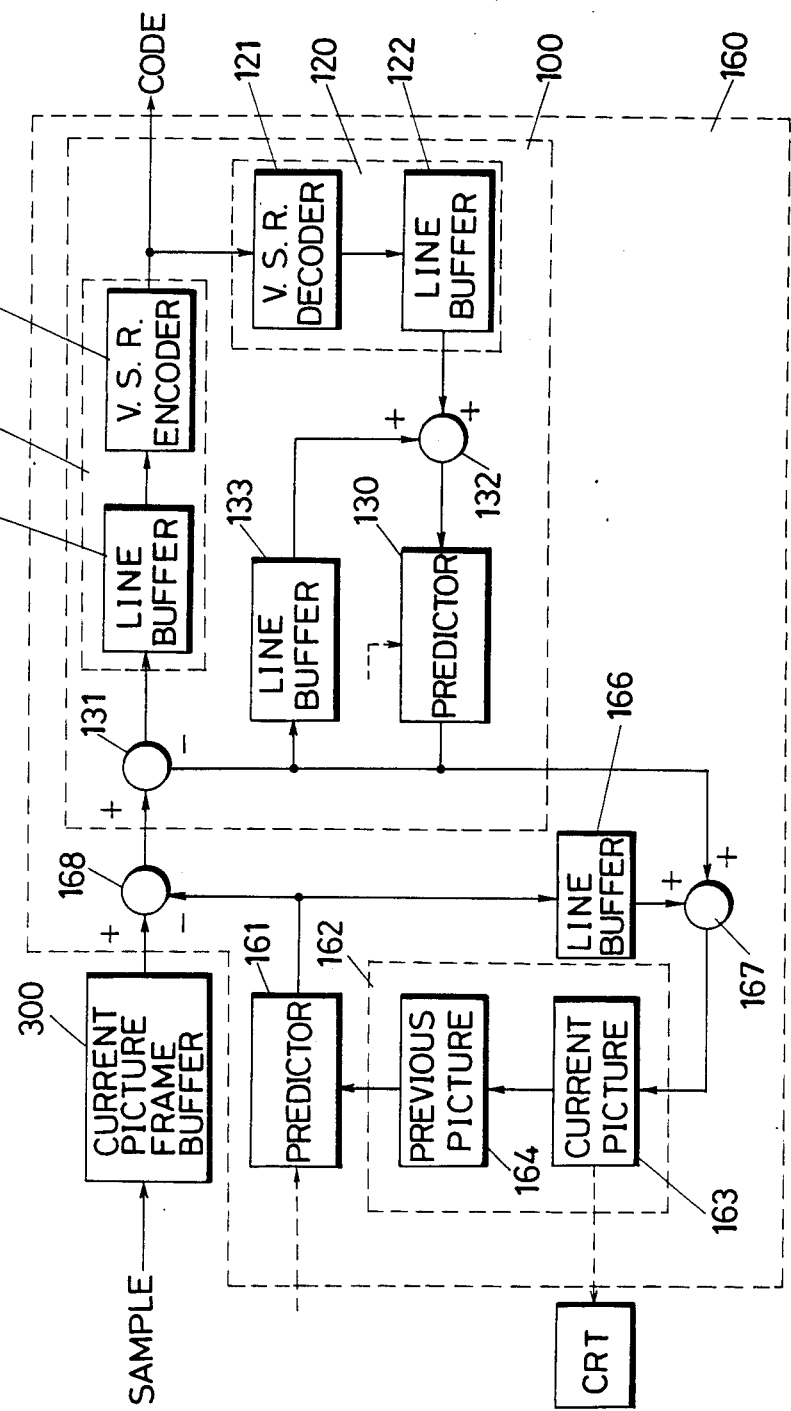
FIGS. 26A and 26B are block diagrams showing respectively an encoding circuit and a decoding circuit which may be employed in the third embodiment.
Figure 26B:
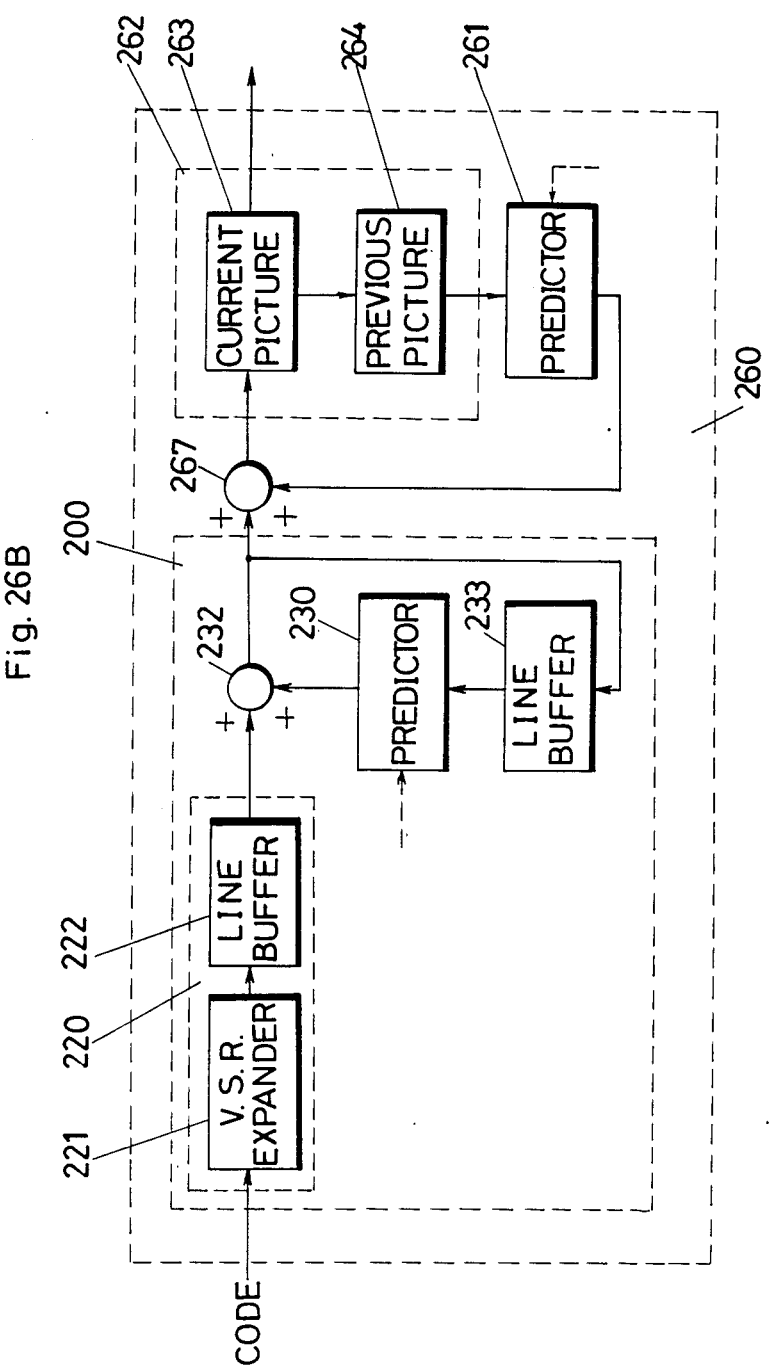
Figure 26C:
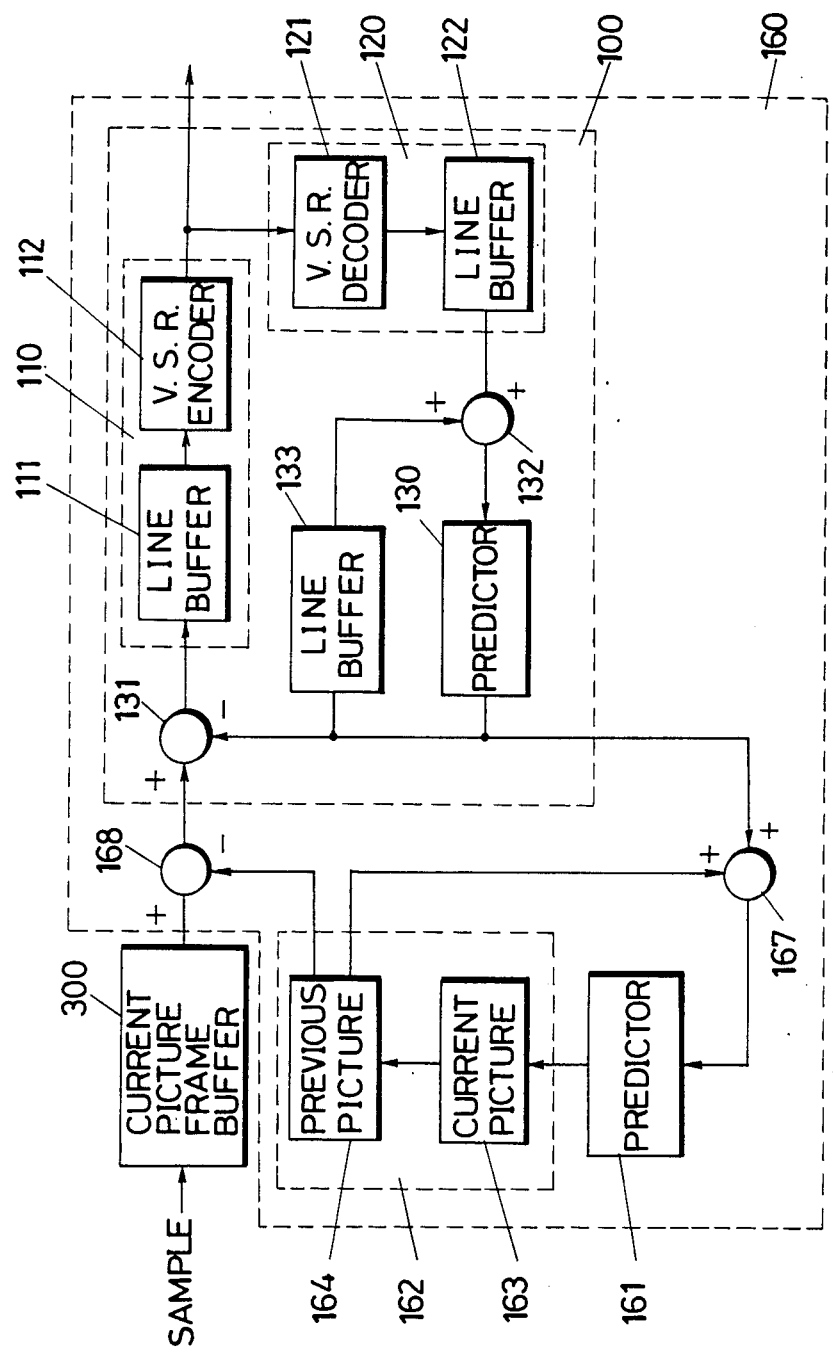
FIG. 26C is a block diagram showing a modified circuit of the encoding circuit in FIG. 26A.

A variable sampling rate prediction coding circuit 100 comprises line buffers 111, 122, 133, and a predictor circuit 130, besides said variable sampling rate encoder circuit 112 and decoder circuit 121, and operates just like the circuit disclosed in FIG. 10A. A frame-to-frame variable sampling rate prediction encoding circuit 160 comprises the frame-to-frame predictor circuit 161, the predicted frame buffer 162, and said variable sampling rate prediction encoding circuit 100, and operates just like the circuit disclosed in FIG. 26C.

In the receiver shown in FIG. 27B, the packet data separator circuit 361 separates a quantization characteristic from received communication data and registers the same into a quantization table 224. A variable sampling rate decoder circuit 221 expands the received code data in accordance with the quantization characteristic in the quantization characteristic table 224. A variable sampling rate prediction decoding circuit 200 comprises line buffers 222, 233 and a predictor circuit 230, and operates just like the circuit disclosed in FIG. 10B. A frame-to-frame variable sampling rate prediction decoder circuit 260 comprises a frame-to-frame predictor circuit 261, a predicted frame buffer 262, and said variable sampling rate prediction decoding circuit 200, and operates just like the circuit disclosed in FIG. 26B.

Figure 30A:
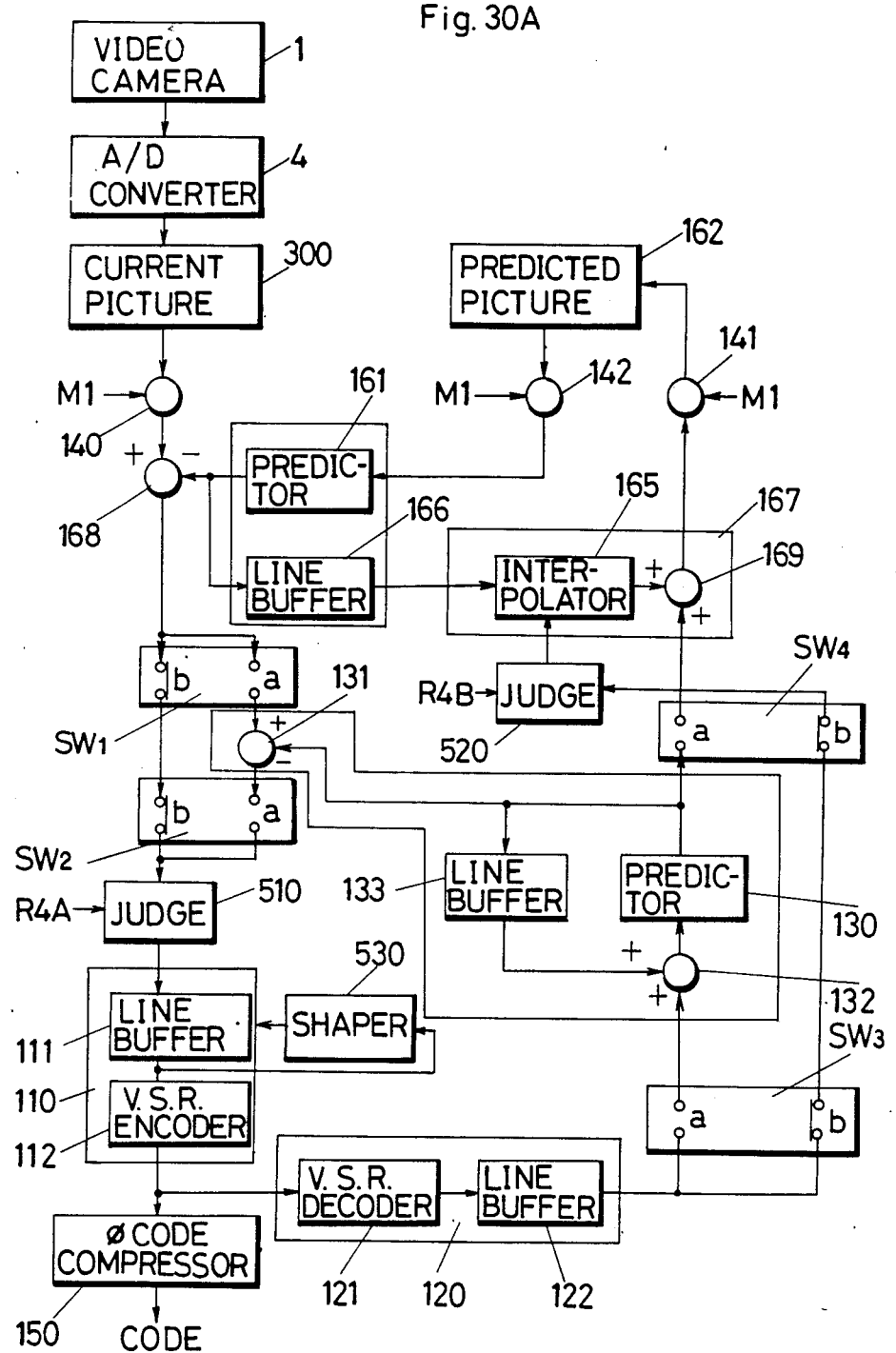
FIGS. 30A and 30B are block diagrams showing respectively a transmitter circuit and a receiver circuit employed in a fifth embodiment of the present invention.
Figure 30B:
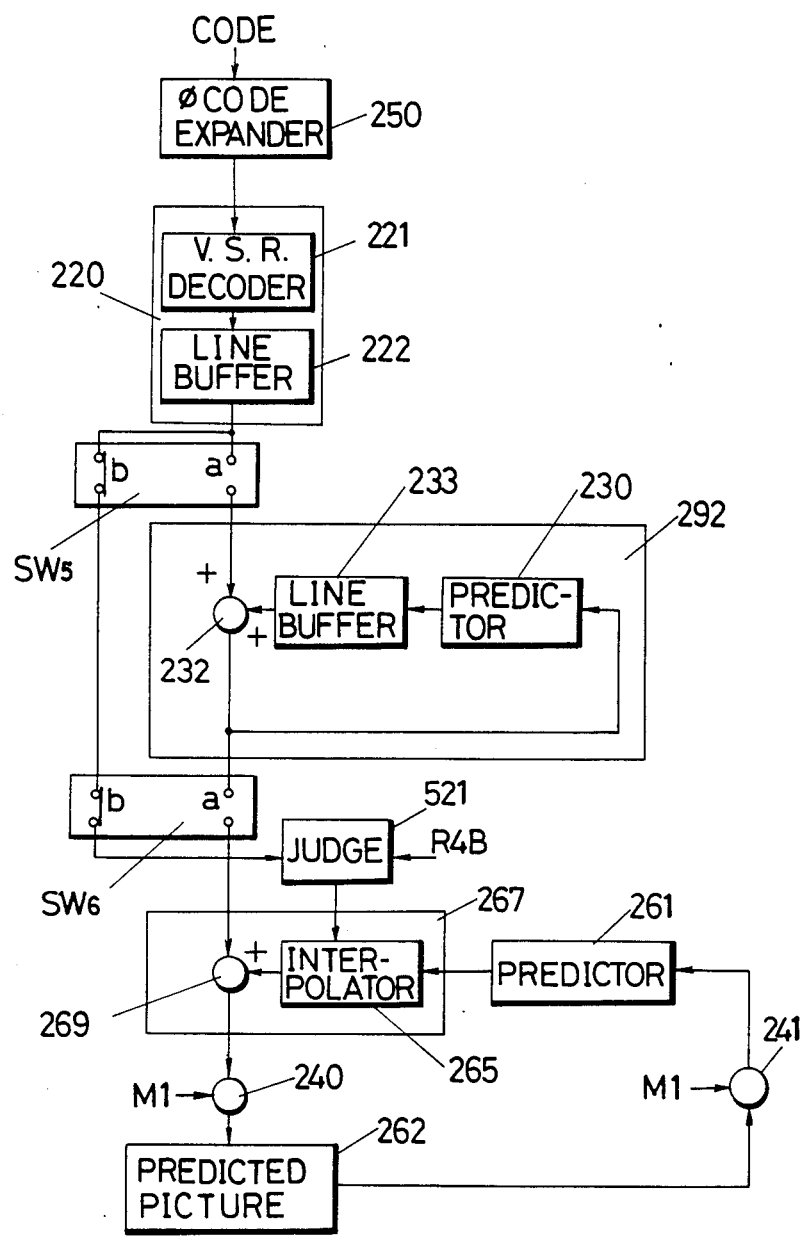

FIG. 30A and FIG. 30B respectively illustrate a transmitter and a receiver of another embodiment of the present invention. In the present embodiment, as the change detection operation is the same as that of the foregoing embodiments, explanations will be given only as to a picture transmission at the time of change detection. In FIG. 30A, a video camera 1 takes a monitored picture, which is converted into a digital picture signal by an A/D converter 4 and memorized in a current picture frame buffer 300. In FIG. 30A, a variable sampling rate encoding circuit 110, a variable sampling rate decoding circuit 120, a primary predictor circuit 191, a secondary predictor circuit 192, an interpolation synthesis circuit 167, a multiplier circuit 140, and a zero code compressor circuit 150 are the same as those described in the preceding embodiments. A divider circuit 141 and a multiplier circuit 142 are possessive of the same factor M1 as that of the multiplier circuit 140. Switching circuits SW1 to SW4 are provided for selecting whether or not the secondary predictor circuit 192 is connected. In FIG. 30B, a variable sampling rate decoding circuit 220, a primary predictor circuit 291, a secondary predictor circuit 292, a divider circuit 240, and a zero code expander circuit 250 are the same as those described in the preceding embodiments. A multiplier circuit 241 is possessive of the same factor M1 as that of the divider circuit 240. Switching circuits SW5 and SW6 are provided for selecting whether or not the secondary predictor circuit 292 is connected.

In the present embodiment, before transmitting a monitored picture or a present picture in a low rate transmission or in a gradual resolving transmission, the changed picture elements, in which frame-to-frame prediction residuals of picture elements roughly thinned out in constant space are greater than a first predetermined value R4A, are separated from the zero picture elements in which said frame-to-frame prediction errors of picture elements are smaller than the first predetermined value R4A. Values of prediction residuals or picture elements of the zero picture elements are set at zero by a changed residual judgment circuit 510. Similarly, a changed residual judgment circuit 520 compares restored values with a second predetermined value R4B, whereby restored values smaller than the second predetermined value R4B are set at zero. Solitary zero picture elements or solitary changed picture elements are eliminated by a change residual shaper circuit 530. Then, changed portions of a picture are transmitted after compression coding.

In the receiver illustrated in FIG. 30B, either of the frame-to-frame prediction residuals or the picture element values of the roughly thinned out picture elements are compared with the second predetermined value R4B in a changed residual judgment circuit 521, whereby values smaller than the second predetermined value R4B are set at zero. Then, received pictures are interpolated and restored by an interpolation synthesis circuit 267.

Similarly, in the transmitter, predicted pictures are interpolated and restored by an interpolation synthesis circuit 167. In said interpolation and restoration in the transmitter, only when adjoining rough lattices or adjoining lattices of roughly thinned out picture elements are changed picture elements, the frame-to-frame prediction residuals or the picture element values are interpolated and restored as to said adjoining lattices of changed picture elements, or as to said changed picture elements and zero picture elements of rough lattices adjoining thereto, whereby only the changed portions are gradually made distinct or resolved without reducing the distinction or the resolution of the surroundings of the changed portions.

Particularly, when the frame-to-frame residuals are transmitted, i.e., when the values of the frame-to-frame residuals are interpolated and restored as to said adjoining rough lattices of changed picture elements, it is preferable to interpolate the values of the zero picture elements within the corresponding section of changed picture elements of the restored or predicted previous picture by the picture element values of the restored previous picture at the location of the changed picture elements, and then to add said interpolated values of the zero picture elements to said interpolated values as to the predicted residual errors. A newly received picture or a newly predicted picture thus interpolated and restored include no background of the previous picture in the changed portion of the rough picture, which reduces blurs of the changed portion.

The above related gradual distinction improvement system or the gradual resolver system makes it possible to ascertain abnormal situations at emergency and take countermeasures at the time of change detection with the aid of the rough picture at first, and to recognize the abnormal situations accurately with the aid of the gradual distinction improvement of the changed portions. In addition, as the monitored picture information is automatically transmitted through the exchange circuit at the time of change detection, it is economical as compared with the system using a personal circuit. Particularly, when a packet circuit is employed, it is preferable for the receiver to receive picture data from a plurality of transmitters simultaneously through one circuit and to indicate them simultaneously by a screen divided in 4, which prevents the circuit from being busy or occupied owing to the packet multiplex, whereby the monitoring system becomes suitable for rapid countermeasures.

Figure 31A:
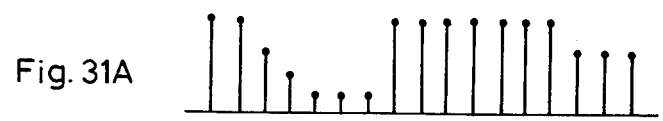
FIGS. 31A to 31I are timing charts to help explain the operation of the fifth embodiment.
Figure 31B:
Figure 31C:
Figure 31D:
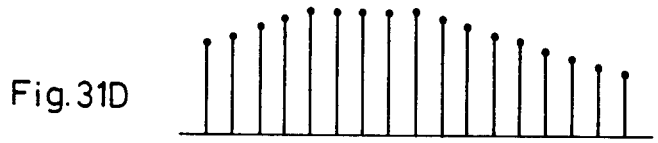

FIGS. 31A to 31I illustrate a gradual distinction improvement operation. FIG. 31A shows predicted picture data, and FIG. 31B shows current picture data. FIG. 31C shows transmission data representing the differences between the predicted picture data in FIG. 31A and the current picture data in FIG. 31B. The transmission data in FIG. 31C is thinned out such that one sample is left among 4. FIG. 31D shows restored picture data in the receiver, which are obtained by replacing the predicted picture data shown in FIG. 31A by said transmitted frame-to-frame prediction residuals shown in FIG. 31C, when said transmitted residuals are not zero, and by interpolating said replaced predicted picture data at said thinned out intervals. In this method, however, there is a drawback that the restored picture becomes blurred and transmission information amount is large because changed picture element data are not compressed.

Figure 31E:
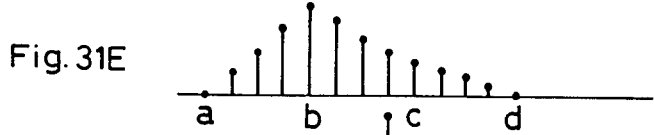
Figure 31F:

FIGS. 31E and 31F show another method. FIG. 31E is interpolated frame-to-frame residuals which are obtained by interpolating the roughly transmitted frame-to-frame residuals shown in FIG. 31C. FIG. 31F is restored picture data which are obtained by adding said interpolated frame-to-frame residuals in FIG. 31E to the predicted picture data in FIG. 31A. In this method, although transmitted rough picture elements are accurately restored, picture elements between said rough picture elements are not accurately restored, which makes received picture blurred.

Figure 31G:
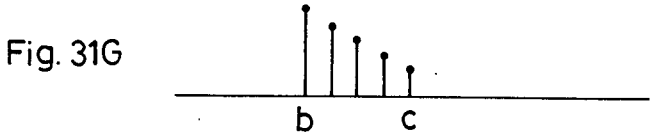
Figure 31H:
Figure 31I:
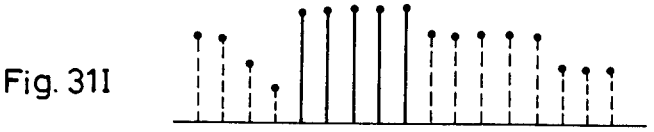

FIGS. 31G to 31I show a preferred method which is employed in the present embodiment. FIG. 31G shows interpolated frame-to-frame residuals which are obtained by interpolating the roughly transmitted frame-to-frame residuals shown in FIG. 31C only between adjoining rough lattices of changed picture elements. FIG. 31H shows interpolated predicted picture data which are obtained by interpolating said predicted picture data in FIG. 31A at said thinned out intervals only between said adjoining rough lattices of changed picture elements. And FIG. 31I shows restored picture data which are obtained by adding the interpolated residuals in FIG. 31G to the interpolated predicted picture data in FIG. 31I, wherein only the changed portions are gradually made distinct or resolved without reducing the distinction or the resolution of the surroundings of the changed portions.

Figure 32A:
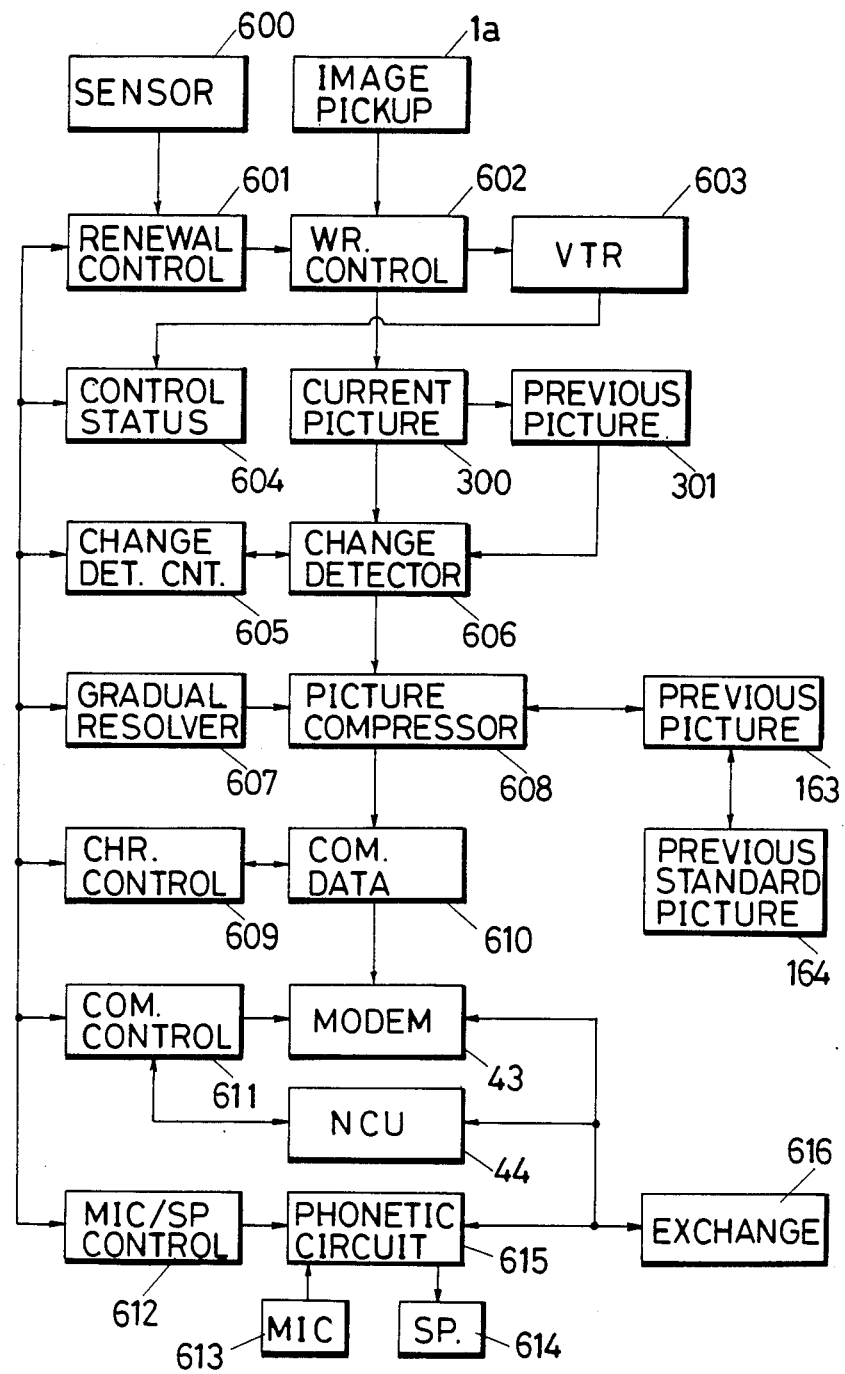
FIGS. 32A and 32B are block diagrams showing a transmitter circuit and a receiver circuit employed in a sixth embodiment of the present invention.
Figure 32B:
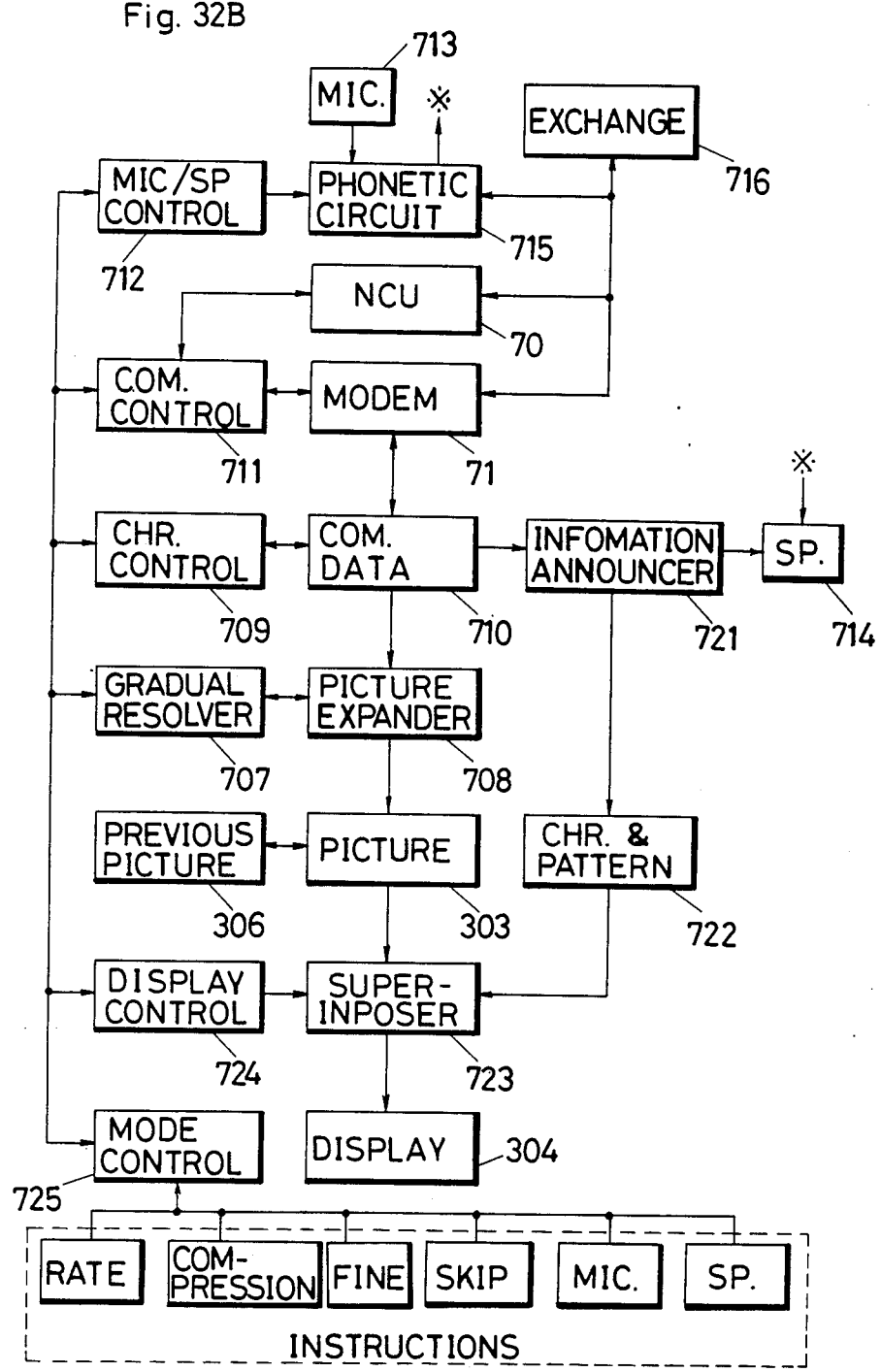

Referring now to FIGS. 32A and 32B, there is illustrated block diagrams of a sixth embodiment of the present invention. FIG. 32A illustrates a transmitter associated with said visual image sensor system, and FIG. 32B illustrates a corresponding receiver. A change detector circuit 606 in FIG. 32A can be regarded as comprising the primary change detector circuit 10 in FIG. 1; or comprising the primary change detector circuit 10 in FIG. 1, the secondary change detector circuit 20 in FIG. 3, and the pattern verification circuit 30 in FIG. 4. A picture compressor circuit 608 and a communication data processing circuit 610 in FIG. 32A can be regarded as corresponding to the data compressor circuit 40 and the coder circuit 42 in FIG. 3. An image pickup 1a can be regarded as comprising the video camera 1 and the A/D converter circuit 4 in FIG. 1. A communication data processing circuit 710 and a picture expander circuit 708 in FIG. 32B can be regarded as corresponding to the decoder circuit 73 and the data expander circuit 79 in FIG. 5.

Change detection operation is repeated at a constant period (e.g., 0.5 second) in accordance with timing and an address controlled by a picture writing controller circuit 602 under the instructions of a current picture renewal timing controller circuit 601. The change detection controller circuit 605 gives the change detector circuit 606 a variety of parameter and standards for judgment. A character information controller circuit 609 generates alarm packet data. A communication data processor circuit 610 edits the alarm packet data in accordance with a prescribed protocol. A communication controller circuit 610 corresponds to the transmission controller 45 in FIG. 4, which automatically dials for data communication by means of a network control unit (NCU) 44 or a circuit terminating unit, the latter being in the case of packet exchange network.

A gradual resolver or a gradual distinction improvement controller circuit 607, which corresponds to the sequencer 370 in FIG. 23A, is provided for controlling compression operation by said gradual distinction improvement. Namely, the gradual resolver circuit 607 controls the picture compressor circuit 608, edits the picture packet data in accordance with a prescribed protocol by the communication data processing circuit 610, and transmits communication data through a MODEM 43 or a packet terminal unit under the control of the communication controller circuit 611.

The receiver in FIG. 32B can send to the transmitter in FIG. 32A "skip" instructions, which mean to abandon a presently receiving picture and request a new or next picture. The skip instructions are sent by a mode controller circuit 725 and a communication controller circuit 711. When said skip instructions are sent to the transmitter in the course of information transmission of the monitored picture or the current picture by low rate transmission or by gradual distinction improvement transmission, the gradual resolver circuit 607 interrupts the transmission of the picture information. Then, the picture writing controller circuit 602 takes new current picture data into a current picture frame buffer 300, which are transmitted by gradual distinction improvement transmission under the control of the gradual resolver circuit 607 and the communication data processing circuit 610.

Similarly, the receiver can send to the transmitter "snap" instructions, which mean to select an instructed compression transmission mode during a constant period or during a constant number of pictures. When said snap instructions are sent to the transmitter in the course of transmission of animated or still pictures by ordinary high rate transmission or by gradual distinction improvement transmission, the gradual resolver circuit 607 interrupts the transmission of the picture information by said high rate transmission or said gradual distinction improvement transmission. Then, new current picture data are taken into the current picture frame buffer 300 in accordance with instructions. Said current picture frame is transmitted by the gradual distinction improvement system in accordance with said instructed compression transmission mode during a constant period or during a constant number of pictures. Said compression transmission mode comprises selection of transmission rate, picture distinction, a compression rate, color elements, etc. Similarly, instructions for selecting transmission rate or instructions for selecting compression mode can be transmitted from the receiver to the transmitter.

A microphone/speaker controller circuit 612 are operated by instructions for speaker calling or by instructions for microphone sound catching which are transmitted from the receiver. When the transmitter receives said instructions for speaker calling from the receiver in the course of information transmission of a monitored picture or a current picture during a constant period or a current picture during a constant period or at the time of change detection by ordinary high rate transmission or by gradual distinction improvement transmission in the form of animated or still pictures, the microphone/speaker controller circuit 612 interrupts the transmission of picture information by said high rate transmission or by said gradual distinction improvement transmission. By a microphone 713, a phonetic circuit 715, and a microphone/speaker controller circuit 712 in the receiver, a calling voice from the receiver is sent to a phonetic circuit 615 and a speaker 614 which is located in the neighborhood of the image pickup 1a. Said speaker 614 gives forth said calling voice from the receiver in order to call after an intruder, whereby the speaker 614 will attract the intruder's attention. Then, under the control of the gradual resolver circuit 607, the current picture frame buffer 300 takes in a new current picture data while the speaker 614 calls after the intruder or after said calling, which are transmitted by gradual distinction improvement transmission etc. in an instructed transmission mode during a constant period or during a constant number of pictures, whereby transmitted pictures may catch abnormal situations such as the intruder's face accurately.

When the transmitter receives said instructions for microphone sound catching from the receiver in the course of information transmission of a monitored picture or a current picture during a constant period or at the time of change detection by ordinary high rate transmission or by gradual distinction improvement transmission in the form of animated or still pictures, the microphone/speaker controller circuit 612 interrupts the transmission of picture information by said high rate transmission or by said gradual distinction improvement transmission. Then, sounds or voices from the transmitter are collected by a microphone 613 neighboring upon the image pickup 1a and a phonetic circuit 615 of the transmitter, and monitored by the microphone/speaker controller circuit 712, the phonetic circuit 715, and the speaker 714 of the receiver. Then, under the control of the gradual resolver circuit 607, the current picture frame buffer 300 takes in new current picture data while the microphone 613 collects sounds and voices or after said collection of sounds and voices, which are transmitted by gradual distinction improvement transmission etc. in an instructed transmission mode during a constant period or during a constant number or pictures, whereby communication with the intruder is allowed by both the visual and the auditory aids, which makes it possible to recognize abnormal status accurately and to take proper countermeasures.

Figure 33A:
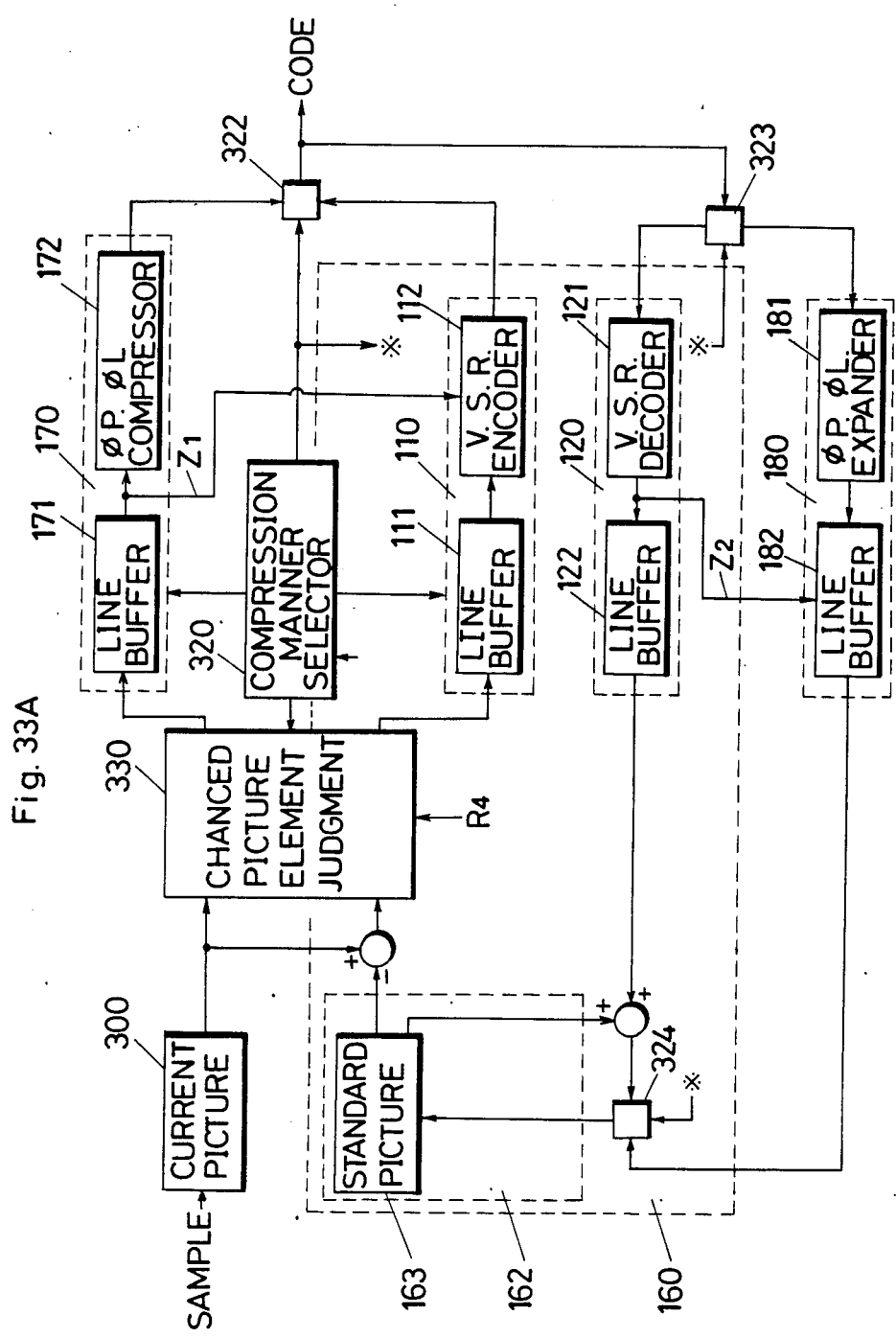
FIGS. 33A and 33B are block diagrams showing respectively an encoding circuit and a decoding circuit which may be employed in the sixth embodiment.
Figure 33B:
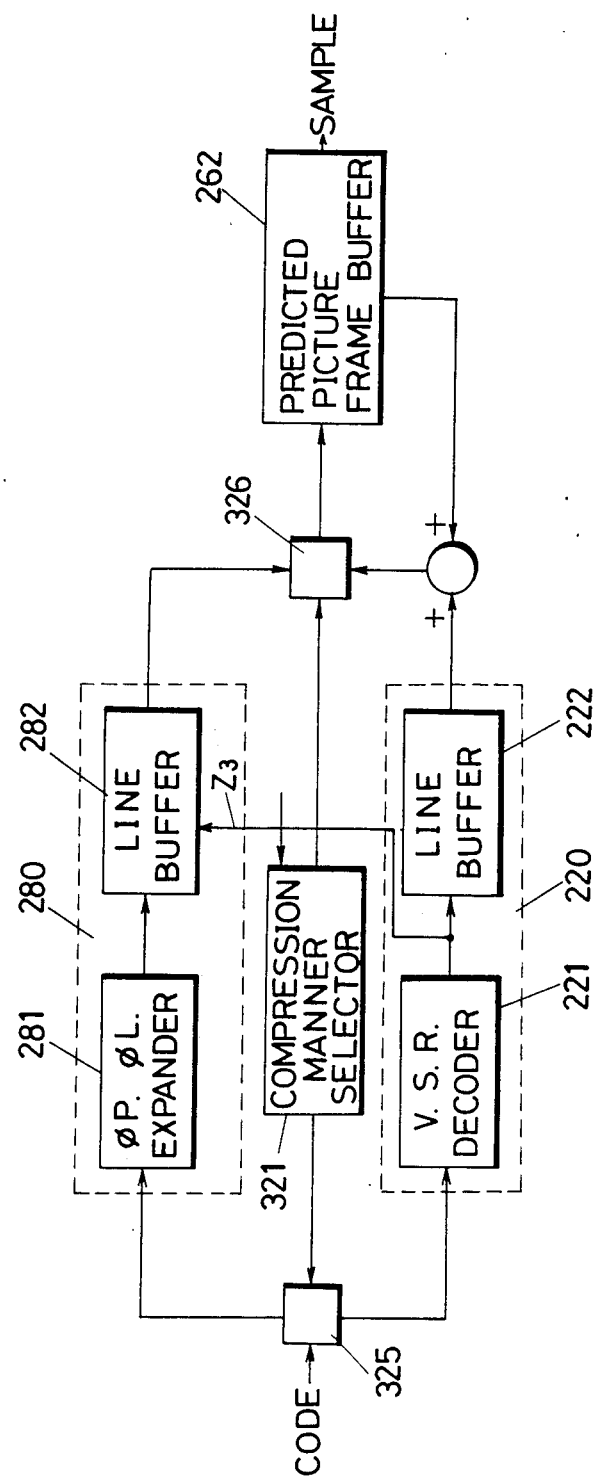

FIGS. 33A and 33B illustrate respectively an encoding circuit and a decoding circuit, which may be employed in the picture compressor circuit 608 and the picture expander circuit 708 in the present embodiment. The illustrated circuits are similar to those disclosed in FIGS. 23A and 23B except that data by-pass lines Z1, Z2, and Z3 are provided. When the by-pass lines Z1 to Z3 are utilized, the changed picture elements are transmitted by the variable sampling rate coding system. If need be, the changed picture element line buffer 171 may include the same data as those obtained at an output of the zero picture element / zero line compressor circuit 172. At this occurrence, the zero picture element / zero line compressed changed picture elements are transmitted by the variable sampling rate coding system.

Figure 34A:
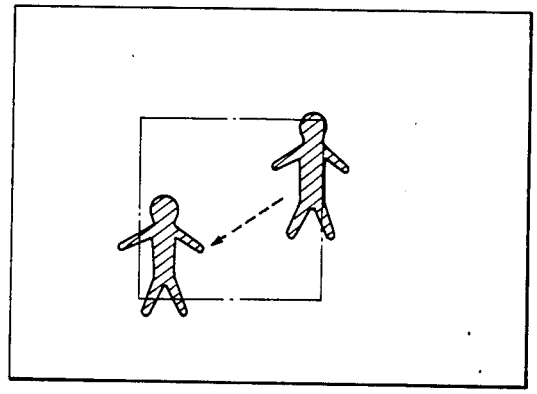
FIGS. 34A, 34B, and 34C are schematic illustrations to help explain the operation of the sixth embodiment.
Figure 34B:
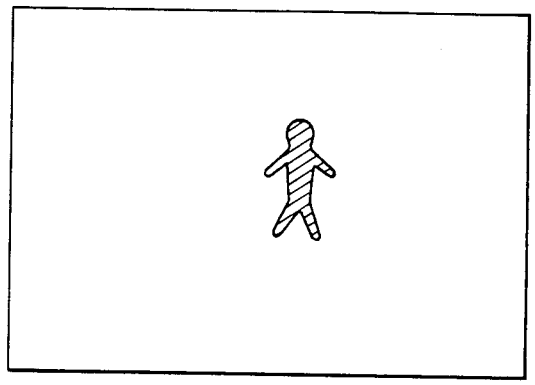
Figure 34C:
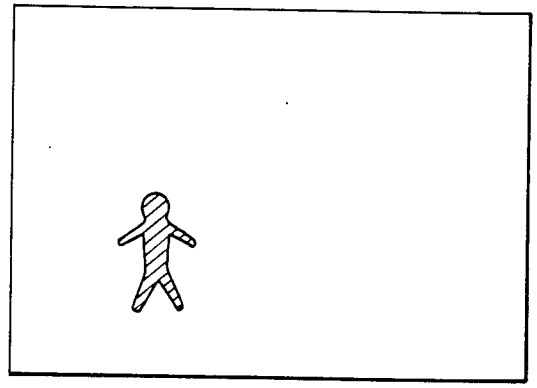

A changed picture element judgment circuit 330 in FIG. 33A is the same as that disclosed in FIG. 23A, wherein the standard value R4 for changed picture element judgment is set smaller than the standard value R1 for change detection, as mentioned before. FIG. 34A illustrates a changed region by a chain line which is determined by the standard value R1. FIGS. 34B and 34C illustrate changed picture elements which are determined by the standard value R4. It is clear from these illustrations that the whole appearance of changed objects can be caught if only the values R1 and R4 are set properly.

The above embodiments and particularly the drawings are set forth for purposes of illustration only. It will be understood that many variations and modifications of the embodiments herein described will be obvious to those skilled in the art and may be carried out without departing from the spirit and scope of the invention.

TABLE I

| QUANTIZATION LEVEL | TIME DIFFERENTIAL VALUE | AMPLITUDE DIFFERENTIAL VALUE |
|---|---|---|
| 1 | 0.40 | 156.4 |
| 2 | 0.60 | 106.6 |
| 3 | 0.72 | 77.5 |
| 4 | 0.80 | 56.8 |
| 5 | 0.86 | 40.8 |
| 6 | 0.92 | 27.7 |
| 7 | 0.96 | 16.6 |
| 8 | 1.00 | 7.00 |
| 9 | 1.50 | 6.14 |
| 10 | 2.00 | 5.29 |
| 11 | 2.50 | 4.42 |
| 12 | 3.00 | 3.57 |
| 13 | 3.50 | 2.71 |
| 14 | 4.00 | 1.86 |
| 15 | 4.50 | 1.00 |
| 16 | 5.00 | 0.00 |

TABLE II

| CODE | QUANTIZATION LEVEL | TIME DIFFERENTIAL VALUE | AMPLITUDE DIFFERENTIAL VALUE | AMPLITUDE OF SAMPLE |
|---|---|---|---|---|
| 0 | 0 | 1 | −64 | −64 & less |
| 1 | 1 | 1 | −32 | −63 to −32 |
| 2 | 2 | 1 | −16 | −31 to −16 |
| 3 | 3 | 1 | −8 | −15 to −8 |
| 4 | 4 | 1 | −4 | −7 to −4 |
| 5 | 5 | 1 | −2 | −3 to −2 |
| 6 | 6 | 2 | −1 | −1 |
| 7 | 7 | 2 | 0 | 0 |
| 8 | 8 | 2 | 1 | 1 |
| 9 | 9 | 1 | 2 | 2 to 3 |
| A | 10 | 1 | 4 | 4 to 7 |
| B | 11 | 1 | 8 | 8 to 15 |
| C | 12 | 1 | 16 | 16 to 31 |
| D | 13 | 1 | 32 | 32 to 63 |
| E | 14 | 1 | 64 | 64 & more |

TABLE III

| TRANSMISSION CODE(8 bits) | MEANINGS |
|---|---|
| F0 | LINE END CODE |
| F1 | 4 CODES ARE ZERO. |
| F2 | 8 CODES ARE ZERO. |
| F3 | 12 CODES ARE ZERO. |
| F4 | 16 CODES ARE ZERO. |
| F5 | 20 CODES ARE ZERO. |
| F6 | 24 CODES ARE ZERO. |
| F7 | 28 CODES ARE ZERO. |
| F8 | 32 CODES ARE ZERO. |
| F9 | 1 LINE IS ZERO. |
| FA | 2 LINES ARE ZERO. |
| FB | 3 LINES ARE ZERO. |
| FC | 4 LINES ARE ZERO. |
| FD | 5 LINES ARE ZERO. |
| FE | 6 LINES ARE ZERO. |
| FF | FRAME END CODE |

TABLE IV

| CODE | QUANTIZATION LEVEL | TIME DIFFERENTIAL VALUE | AMPLITUDE DIFFERENTIAL VALUE | AMPLITUDE OF SAMPLE |
|---|---|---|---|---|
| 0 | 0 | 1 | −256 | −256 & less |
| 1 | 1 | 1 | −128 | −255 to −128 |
| 2 | 2 | 1 | −64 | −127 to −64 |
| 3 | 3 | 1 | −32 | −63 to −32 |
| 4 | 4 | 1 | −16 | −31 to −16 |
| 5 | 5 | 1 | −8 | −15 to −8 |
| 6 | 6 | 1 | −4 | −7 to −4 |
| 7 | 9 | 1 | 0 | −3 to 3 |
| 8 | 12 | 1 | 4 | 4 to 7 |
| 9 | 13 | 1 | 8 | 8 to 15 |
| A | 14 | 1 | 16 | 16 to 31 |
| B | 15 | 1 | 32 | 32 to 63 |
| C | 16 | 1 | 64 | 64 to 127 |
| D | 17 | 1 | 128 | 128 to 255 |
| E | 18 | 1 | 256 | 256 & more |

TABLE V

| CODE | QUANTIZATION LEVEL | TIME DIFFERENTIAL VALUE | AMPLITUDE DIFFERENTIAL VALUE | AMPLITUDE OF SAMPLE |
|---|---|---|---|---|
| 0 | 1 | 1 | −128 | −128 & less |
| 1 | 2 | 1 | −64 | −127 to −64 |
| 2 | 3 | 1 | −32 | −63 to −32 |
| 3 | 4 | 1 | −16 | −31 to −16 |
| 4 | 5 | 1 | −8 | −15 to −8 |
| 5 | 6 | 1 | −4 | −7 to −4 |
| 6 | 7 | 1 | −2 | −3 to −2 |
| 7 | 9 | 1 | 0 | −1 to 1 |
| 8 | 11 | 1 | 2 | 2 to 3 |
| 9 | 12 | 1 | 4 | 4 to 7 |
| A | 13 | 1 | 8 | 8 to 15 |
| B | 14 | 1 | 16 | 16 to 31 |
| C | 15 | 1 | 32 | 32 to 63 |
| D | 16 | 1 | 64 | 64 to 127 |
| E | 17 | 1 | 128 | 128 & more |

TABLE VI

| CODE | QUANTIZATION LEVEL | TIME DIFFERENTIAL VALUE | AMPLITUDE DIFFERENTIAL VALUE | AMPLITUDE OF SAMPLE |
|---|---|---|---|---|
| 0 | 2 | 1 | −64 | −64 & less |
| 1 | 3 | 1 | −32 | −63 to −32 |
| 2 | 4 | 1 | −16 | −31 to −16 |
| 3 | 5 | 1 | −8 | −15 to −8 |
| 4 | 4 | 2 | −16 | −16 & less |
| 5 | 5 | 2 | −8 | −15 to −8 |
| 6 | 6 | 2 | −4 | −7 to −4 |
| 7 | 9 | 2 | 0 | −3 to 3 |
| 8 | 12 | 2 | 4 | 4 to 7 |
| 9 | 13 | 2 | 8 | 8 to 15 |
| A | 14 | 2 | 16 | 16 & more |
| B | 13 | 1 | 8 | 8 to 15 |
| C | 14 | 1 | 16 | 16 to 31 |
| D | 15 | 1 | 32 | 32 to 63 |
| E | 16 | 1 | 64 | 64 & more |

TABLE VII

| CODE | QUANTIZATION LEVEL | TIME DIFFERENTIAL VALUE | AMPLITUDE DIFFERENTIAL VALUE | AMPLITUDE OF SAMPLE |
|---|---|---|---|---|
| 0 | 1 | 1 | −128 | −128 & less |
| 1 | 2 | 1 | −64 | −127 to −64 |
| 2 | 3 | 1 | −32 | −63 to −32 |

TABLE VII-continued

| CODE | QUANTI-ZATION LEVEL | TIME DIFFERENTIAL VALUE | AMPLITUDE DIFFERENTIAL VALUE | AMPLITUDE OF SAMPLE |
|---|---|---|---|---|
| 3 | 4 | 1 | −16 | −31 to −16 |
| 4 | 3 | 2 | −32 | −32 & less |
| 5 | 4 | 2 | −16 | −31 to −16 |
| 6 | 5 | 2 | −8 | −15 to −8 |
| 7 | 9 | 2 | 0 | −7 to 7 |
| 8 | 13 | 2 | 8 | 8 to 15 |
| 9 | 14 | 2 | 16 | 16 to 31 |
| A | 15 | 2 | 32 | 32 & more |
| B | 14 | 1 | 16 | 16 to 31 |
| C | 15 | 1 | 32 | 32 to 63 |
| D | 16 | 1 | 64 | 64 to 127 |
| E | 17 | 1 | 128 | 128 & more |

TABLE VIII

| TRANSMISSION CODE(8 bits) 7 6 5 4 3 2 1 0 | MEANINGS |
|---|---|
| 0 0 * * * * * * | DATA OF CHANGED PICTURE ELEMENTS |
| 0 1 * * * * * * | THE NUMBER OF ZERO PICTURE ELEMENTS |
| 1 0 * * * * * * | THE NUMBER OF ZERO LINES |
| 1 1 1 1 0 0 0 0 | LINE END CODE (F0) |
| 1 1 1 1 1 1 1 1 | FRAME END CODE (FF) |

What is claimed is:
1. A visual image sensor system comprising:
means for monitoring a given region and generating monitored picture data,
means for memorizing a plurality of standard picture data including normal changes of the monitored picture data,
means for memorizing one or more selection standards for selecting standard picture data to be compared with said monitored picture data,
means for memorizing one or more judgment standards to judge existence of a picture change by said comparison, and
means for comparing the monitored picture data with all the standard picture data that are selected on said selection standards and for issuing an alarm when a changed amount detected by said comparison is greater than said judgment standards.

2. The visual image sensor system as set forth in claim 1, wherein said selection standards comprise time ranges and predetermined light intensity ranges in the monitored region, said standard picture data for comparison being selected such that current time and current light intensity of the monitored region are respectively within the time range and the light intensity range of said selected standard picture data.

3. The visual image sensor system as set forth in claim 1, wherein said standard picture data are renewed when a difference between the standard picture data and the monitored picture data at a constant interval is below a predetermined level.

4. The visual image sensor system as set forth in claim 3, wherein said standard picture data to be renewed are replaced by average data of a plurality of previous picture data.

5. The visual image sensor system as set forth in claim 1, including:
line drawing generating means for generating line drawing data as standard picture data for the monitored picture data on the basis of contours and edges included in the normal standard picture data,
line designating means for designating important lines among said line drawing data as a standard data for change detection judgment of the line drawing data, and
judging means for judging a change to be existent when said important lines are concealed to a predetermined extent.

6. The visual image sensor system as set forth in claim 1, including a flamy/non-flamy abnormality discriminator means comprising, in combination:
means for illuminating an object within the monitored region,
means for memorizing in advance normal standard picture data with and without said illumination by switching said illumination on and off when there is no abnormality,
means for taking monitored picture data with and without said illumination by switching said illumination on and off, and
means for generating a non-flamy abnormality detection signal when a change is detected only in said monitored picture data with said illumination and generating a flamy abnormality detection signal when changes are detected in both of said monitored picture data with and without said illumination.

7. The visual image sensor system as set forth in claim 1, including:
means for generating a menacing sound and/or light when a change occurs within a predetermined vigilance region of the monitored picture, and
means for judging alarm levels by the positions of the changed object after said menacing sound and/or light.

8. The visual image sensor system as set forth in claim 7, wherein said alarm level is set at a minimum when the changed object disappears after said menacing sound and/or light, in a middle range when the changed object does not move, and at a maximum when the changed object moves into a region of a higher vigilance level.

9. The visual image sensor system as set forth in claim 1, including means for transmitting the monitored picture data at the time of change detection through a narrow-band channel after information compression.

10. The visual image sensor system as set forth in claim 9, wherein only a changed region of a monitored picture is transmitted.

11. The visual image sensor system as set forth in claim 10, wherein said changed region is determined by a change detector means comprising, in combination:
means for calculating absolute values of differences between picture elements of the currently monitored picture data and of the standard picture data,
means for calculating projected values upon X axis and Y axis by summing up said absolute values on lines perpendicular to the respective axes,
means for detecting maximum values and minimum values of X coordinate data and Y coordinate data in which said projected values are greater than a standard value for projection intensity judgment, and
means for judging a change to be existent when the size of a rectangular region determined by said minimum and maximum values is greater than a standard value for projection size judgment.

12. The visual image sensor system as set forth in claim 10, wherein aid changed region is determined by a change detector means comprising, in combination:
- means for calculating absolute values of differences between picture elements of the currently monitored picture data and of the standard picture data,
- means for examining change magnitude of the respective picture elements which makes said absolute values zero when said absolute values are smaller than a standard value for change detection judgment of picture element wherein a picture element change can be judged to be valid,
- means for calculating projected values upon X axis and Y axis by summing up said examined absolute values in lines perpendicular to the respective axes,
- means for detecting maximum values and minimum values of X coordinate data and Y coordinate data in which said projected values are greater than a standard value projection intensity judgment, and
- means for judging a change to be existent when the size of a rectangular region determined by said minimum and maximum values is greater than a standard value for a projection size judgment.

13. The visual image sensor system as set forth in claim 9 or 10, wherein said picture information is transmitted through exchange communication networks by automatically dialing a telephone communication means.

14. The visual image sensor system as set forth in claim 10, wherein transmitted picture information of a changed region is restored and converted into a constant size normalized picture frame.

15. The visual image sensor system as set forth in claim 10, wherein a normalized picture frame of the changed region is transmitted.

16. The visual image sensor system as set forth in claim 9, wherein line drawing data comprising contours and edges of the monitored region are transmitted before transmitting the picture data.

17. The visual image sensor system as set forth in claim 16, wherein line drawing data of a new change are transmitted instead of a previous picture data when said new change occurs while said previous picture data are being transmitted.

18. The visual image sensor system as set forth in claim 9 or 10, wherein said picture data is transmitted by a variable sampling rate coding system of line-to-line prediction residuals.

19. The visual image sensor system as set forth in claim 9 or 10, wherein said picture data is transmitted by a DPCM system of line-to-line prediction residuals.

20. The visual image sensor system as set forth in claim 18, wherein a sampling rate is reduced in changeless portions in accordance with a predetermined relationship between quantization values and sampling intervals of samples of a prediction residual signal, said quantization values of different sampling intervals being overlapped, whereby said predetermined relationship corresponds to a combination of said quantization values and said sampling intervals.

21. The visual image sensor system as set forth in claim 20, wherein a minimum quantum of samples is multiplied by a predetermined value at an input of a predictor, a minimum quantum of quantization characteristic being greater than the original minimum quantum of samples and smaller than a multiplied value of an original permissible amplitude error of said sample.

22. The visual image sensor system as set forth in claim 10, including:
- means for calculating frame-to-frame residuals which are errors between current picture frame data and predicted values based on previous picture frame data already transmitted,
- means for discriminating changed picture elements which are greater than a changed picture element judgment standard value smaller than said standard value for change detection judgment of picture elements from zero picture elements which are not greater than said changed picture element judgment standard value,
- means for setting values of said zero picture elements at zero, and
- means for transmitting said changed picture elements.

23. The visual image sensor system as set forth in claim 22, including:
- means for eliminating solitary zero picture elements among changed picture elements by converting a few zero picture elements surrounded by changed picture elements into changed picture elements, and
- means for eliminating solitary changed picture elements among zero picture elements by converting a few changed picture elements surrounded by zero picture elements into zero picture elements.

24. The visual image sensor system as set forth in claim 22, wherein said transmitted changed picture elements are the frame-to-frame residuals.

25. The visual image sensor system as set forth in claim 22, wherein said transmitted changed picture elements are the picture elements of the current picture frame.

26. The visual image sensor system as set forth in claim 22, wherein said zero picture elements are transmitted in a coded form showing the number of the zero picture elements and the number of zero lines in which all the picture elements are the zero picture elements, said changed picture elements being transmitted in an original form showing picture element values, the current picture frame values being replaced by the predicted picture frame values of said changed picture elements.

27. The visual image sensor system as set forth in claim 22, wherein said changed picture element is transmitted as an initial value of prediction in transition from the zero picture element to the changed picture element, said zero picture element being transmitted as a terminate value of prediction in transition from the changed picture element to the zero picture element.

28. The visual image sensor system as set forth in claim 22, wherein the number of zero codes meaning that the changed picture elements are zero and the number of zero lines meaning that all the picture elements are zero codes are transmitted in a coded form.

29. The visual image sensor system as set forth in claim 22, wherein a prediction coefficient of a frame-to-frame predictor circuit is selectable.

30. The visual image sensor system as set forth in claim 22, wherein said frame-to-frame residuals are compressed by a quantization characteristic whose compression rate is such that a general outline of a changed portion of the picture is recognizable, a writing operation into a current picture frame buffer for renewal of the current picture being inhibited to fix picture data within the current picture frame buffer as the current picture frame by instructions from a receiver, the frame-to-frame residuals between said fixed current picture frame and predicted values based on the previous picture frame already transmitted being transmitted repeatedly after information compression by quantization characteristic of a lower compression rate, whereby the predicted value approaches the actual value and resolution of the transmitted pictures is improved gradually.

31. The visual image sensor system as set forth in claim 22, wherein the change amount of the frame-to-frame residuals is, when it is large, reduced by making a spatial filter for averaging filtering said frame-to-frame residuals before transmission.

32. The visual image sensor system as set forth in claim 31, wherein said spatial filter is selectable and repeatedly operable.

33. The visual image sensor system as set forth in claim 31, wherein low frequency components of the frame-to-frame residuals are firstly transmitted by setting a previous picture frame data already transmitted at zero and by making a first spatial filter having a higher averaging ability act upon the current picture frame before transmission, high frequency components of the frame-to-frame residuals being secondly transmitted by making a second spatial filter having a lower averaging ability act upon the succeeding current picture frames, whereby the predicted value approaches the actual value and resolution of the transmitted pictures is improved gradually.

34. The visual image sensor system as set forth in claim 9, including:
means for generating rough picture elements which are roughly thinned out at a constant space,
means for calculating frame-to-frame residuals which are errors between current picture frame data and predicted values based on a previous picture frame already transmitted,
means for discriminating changed rough picture elements which are greater than a changed rough picture element judgment standard value smaller than a standard value for change detection judgment of rough picture elements from zero rough picture elements which are not greater than said changed rough picture element judgment standard value,
means for setting values of said zero rough picture elements at zero,
means for transmitting said changed rough picture elements, and
means for interpolating said changed rough picture elements,
said interpolation being carried out, only when roughly thinned out adjoining picture element lattices are changed picture elements, within a section including said adjoining lattices of changed picture elements.

35. The visual image sensor system as set forth in claim 34, wherein said interpolation is further carried out within a section including said changed rough picture elements and zero rough picture elements of said rough lattices adjoining thereto.

36. The visual image sensor system as set forth in claim 34, wherein said changed rough picture element is transmitted as said frame-to-frame residuals, the values of the predicted picture elements within the corresponding section of said changed rough picture elements being interpolated by the picture element values of said predicted picture at the positions of said changed rough picture elements, and being added to said interpolatd values of the frame-to-frame residuals, whereby a predicted picture is interpolated and restored.

37. The visual image sensor system as set forth in claim 9, wherein picture information of the monitored picture data is rapidly transmitted by picture information data of a rough picture whose lattice is rougher than a sampling lattice and such that a general outline of a changed portion of the picture is recognizable, said rough picture being interpolated in the receiver to indicate the same and wherein a fine current picture frame is transmitted after information compression by instructions from the receiver to make pictures fine, whereby resolution of the transmitted pictures are gradually improved.

38. The visual image sensor system as set forth in claim 9, wherein said transmission of the monitored picture data is, on receiving skip instructions from a receiver, interrupted and replaced by a gradual distinction improvement transmission of a new current picture frame.

39. The visual image sensor system as set forth in claim 9, wherein said transmission of the monitored picture data is, on receiving snap instructions from a receiver, interrupted and replaced by a gradual distinction improvement transmission of a new current picture frame during a constant period.

40. The visual image sensor system as set forth in claim 9, including a speaker in a transmitter, wherein said transmission of the monitored picture data is, on receiving instructions for calling by the speaker from a receiver, interrupted and replaced by a gradual distinction improvement transmission of a new current picture frame corresponding to said speaker calling during a constant period.

41. The visual image sensor system as set forth in claim 9, including a microphone in a transmitter, wherein said transmission of the monitored picture data is, on receiving instructions for listening by the microphone from a receiver, interrupted and replaced by a gradual distinction improvement transmission of a new current picture frame corresponding to said microphone listening during a constant period.

42. A visual image sensor system comprising:
means for monitoring a given region and generating monitored picture data,
means for memorizing a plurality of picture data including abnormal situations as standard picture data for the monitored picture data,
means for comparing the monitored picture data with said memorized picture data to identify a changed object,
means for memorizing judgment standard values for judging sizes and positions of changed objects for the respective picture data memorized,
means for comparing said identified picture data with the monitored picture data in accordance with said judgment standard values to issue an alarm when a change is judged to be abnormal as a result of said comparison.

43. The visual image sensor system as set forth in claim 42, including means for transmitting the monitored picture data at the time of abnormal change detection through a narrow-band channel after information compression.

44. The visual image sensor system as set forth in claim 42, including:

a knowledge base memorizing registered pattterns that include normal standard picture data and a variety of patterns of abnormal situations in line drawings changed form said picture data and that are expressed in classed list-formed models including numerical data which are based on a comprehensive relationship of features of essential and fundamental elements and on analyzed structure expressed by a relationship based on physical rules, means for identifying the changed object by inferring from and searching said knowledge base, means for generating current picture pattern data describing monitored scenes by judging a position and a size of the change object in accordance with restriction conditions attendant on said models in the knowledge base, means for detecting the motion of and the moving direction of the change object by identifying the changed object on a succession of said generated pattern data, and means for discriminating abnormal conditions from normal conditions in accordance with judgment standards comprising shapes, sizes, positions, and moving directions of the changed object.

45. The visual image sensor system as set forth in claim 44, wherein said knowledge base memorizes rules for interpreting meanings of the monitored scenes from judged results of said shapes, sizes, positions, and moving directions of the changed object, said rules for interpreting meanings of the monitored scenes being used for judging whether or not the respective elements comprising said shapes, positions, sizes, moving directions of the changed object in the registered picture data belong to the same category with that to which the respective elements of the changed object in the monitored picture belong.

* * * * *